(12) United States Patent
Okayama

(10) Patent No.: US 10,228,512 B2
(45) Date of Patent: Mar. 12, 2019

(54) WAVELENGTH FILTER

(71) Applicants: Oki Electric Industry Co., Ltd., Tokyo (JP); Photonics Electronics Technology Research Association, Tokyo (JP)

(72) Inventor: Hideaki Okayama, Tokyo (JP)

(73) Assignees: Oki Electric Industry Co., Ltd., Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/629,312

(22) Filed: Jun. 21, 2017

(65) Prior Publication Data

US 2018/0088275 A1  Mar. 29, 2018

(30) Foreign Application Priority Data

Sep. 29, 2016 (JP) .................. 2016-191887
Sep. 29, 2016 (JP) .................. 2016-191890

(51) Int. Cl.

| G02B 6/124 | (2006.01) |
|---|---|
| G02B 6/12 | (2006.01) |
| G02B 6/14 | (2006.01) |
| G02F 1/01 | (2006.01) |
| G02B 6/122 | (2006.01) |
| G02F 1/025 | (2006.01) |

(52) U.S. Cl.
CPC ......... *G02B 6/12007* (2013.01); *G02B 6/124* (2013.01); *G02B 6/1228* (2013.01); *G02B 6/14* (2013.01); *G02F 1/0147* (2013.01); *G02F 1/025* (2013.01); *G02F 2201/307* (2013.01); *G02F 2203/055* (2013.01)

(58) Field of Classification Search
None
See application file for complete search history.

(56) References Cited

U.S. PATENT DOCUMENTS

| 4,966,431 A | * | 10/1990 | Heismann | ............. | G02F 1/0136 385/11 |
|---|---|---|---|---|---|
| 5,887,094 A | * | 3/1999 | Bakhti | ............... | G02B 6/02095 385/27 |
| 6,108,469 A | | 8/2000 | Chen | | |

(Continued)

FOREIGN PATENT DOCUMENTS

| JP | H10-090551 A | 4/1998 |
|---|---|---|
| JP | 2000-171762 A | 6/2000 |

(Continued)

*Primary Examiner* — Michelle R Connelly
(74) *Attorney, Agent, or Firm* — Rabin & Berdo, P.C.

(57) ABSTRACT

Provided is a wavelength filter including: an optical waveguide core that includes n (n is an integer greater than or equal to 2) number of mode conversion parts and n−1 number of cavity parts that are alternately connected to each other in series; and cladding that surrounds the optical waveguide core. The mode conversion parts convert light having a specific wavelength of a p-order mode (p is an integer satisfying p≥0) into light of a q-order mode (q is an integer satisfying q>p) and reflect the light. The cavity parts match phases of the light having the specific wavelength of the p-order mode propagating through the cavity part.

5 Claims, 17 Drawing Sheets

(56) References Cited

U.S. PATENT DOCUMENTS

| | | | |
|---|---|---|---|
| 2003/0035455 A1 | 2/2003 | Steffens | |
| 2006/0222039 A1 | 10/2006 | Yamazaki | |
| 2015/0293384 A1 | 10/2015 | Ogawa et al. | |

FOREIGN PATENT DOCUMENTS

| | | | |
|---|---|---|---|
| JP | 2002-353556 A | 12/2002 | |
| JP | 2003-215515 A | 7/2003 | |
| JP | 2006-278770 A | 10/2006 | |
| JP | 2006-330104 A | 12/2006 | |
| JP | 2013-093627 A | 5/2013 | |
| JP | 2014-126728 A | 7/2014 | |
| JP | 2015-078866 A | 4/2015 | |
| JP | 2015-121696 A | 7/2015 | |
| WO | WO 2014-156885 A1 | 10/2014 | |

\* cited by examiner

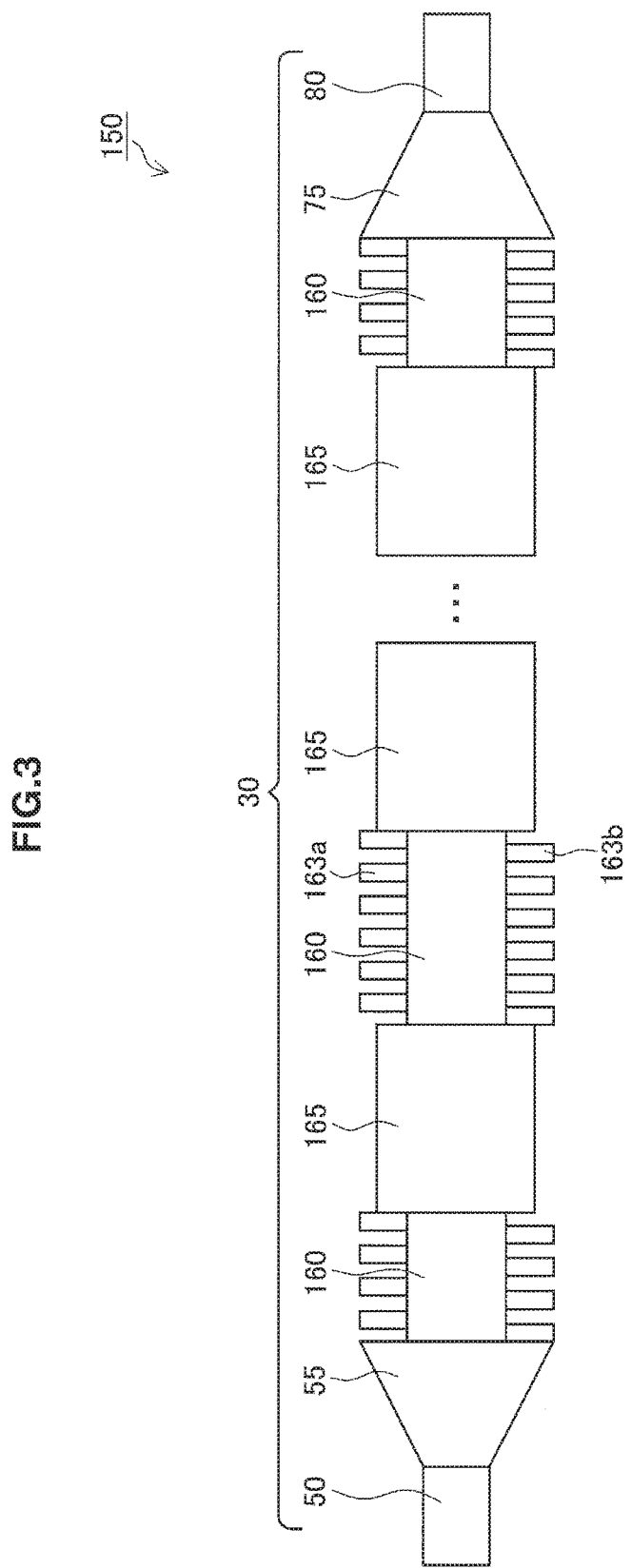

FIG.7
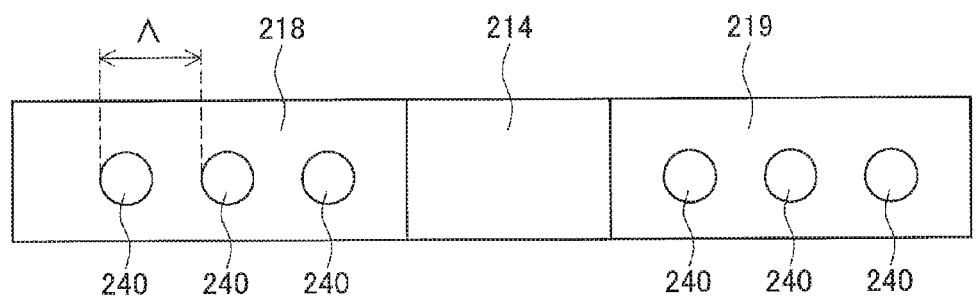
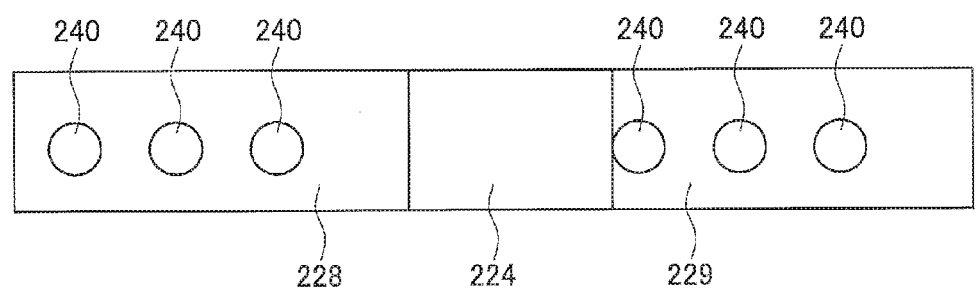

WAVELENGTH FILTER

CROSS REFERENCE TO RELATED APPLICATION(S)

This application is based upon and claims benefit of priority from Japanese Patent Application No. 2016-191887, filed on Sep. 29, 2016, and Japanese Patent Application No. 2016-191890, filed on Sep. 29, 2016, the entire contents of each of which are incorporated herein by reference.

BACKGROUND

The present invention relates to a wavelength filter.

As optical devices that have advantages in miniaturization and mass production have been developed, Si waveguides using silicon as material of the waveguides have gained attention in recent years.

With regard to a Si waveguide, an optical waveguide core which substantially serves as a light transmission path is formed using silicon as material thereof. Then, a circumference of the optical waveguide core is covered by cladding whose material is, for example, silica having a lower refractive index than silicon. Since a difference between refractive indices of the optical waveguide core and the cladding is very significant in the above-described configuration, it is possible to tightly confine light to the optical waveguide core. As a result, a small-size curved waveguide whose bend radius is reduced to, for example, about 1 µm can be realized. Optical circuits with a similar size to electronic circuits can be produced with such small-size curved waveguides, which brings an advantage of overall miniaturization of an optical device.

In addition, a manufacturing procedure of a semiconductor device such as a complementary metal oxide semiconductor (CMOS) can be applied to manufacturing of Si waveguides. Therefore, opto-electronic fusion (silicon photonics) in which an electronic function circuit and an optical function circuit are consolidated on a chip is expected to be realized.

In a passive optical network (PON) which uses wavelength division multiplexing (WDM), different reception wavelengths are allocated to respective optical network units (ONU). An optical line terminal (OLT) generates downlink optical signals with respect to of the respective ONUs having transmission wavelengths corresponding to reception wavelengths of transmission destinations, and multiplexes and transmits the signals. Each of the ONUs selectively receives an optical signal having a reception wavelength allocated thereto from downlink optical signals multiplexed with a plurality of wavelengths. Each of the ONUs uses a wavelength filter in order to selectively receive the downlink optical signals having a reception wavelength thereof. In addition, a technology of constructing a wavelength filter with the above-described Si waveguide has been realized.

Wavelength filters which use Si waveguides include, for example, a wavelength filter that uses a Mach-Zehnder interferometer and a wavelength filter that uses an array waveguide grating. In addition, ring resonators (disclosed in, for example, Patent Literature 1: JP 2003-215515A, Patent Literature 2: JP 2013-093627A, Patent Literature 3: JP 2006-278770A, and the like) and grating type wavelength filters (disclosed in, for example, Patent Literature 4: JP 2006-330104A, and the like) or directional coupler type wavelength filters (disclosed in, for example, Patent Literature 5: JP 2002-353556A, and the like) can be exemplified as wavelength filters which use Si waveguides. These wavelength filters have an advantage of causing output wavelengths to be variable by including electrodes and using heat from the electrodes.

Here, the grating type or directional coupler type wavelength filters output light having a unimodal wavelength peak. Conversely, the ring resonators output light having multimodal wavelength peaks. For this reason, the ring resonators have an advantage of expanding wavelength variable regions by exploiting the Vernier effect in which a plurality of wavelength peaks of output light is used.

SUMMARY

A ring resonator using a Si waveguide is configured to include a ring waveguide part using silicon as material thereof, and a directional coupler part.

The directional coupler part of the ring resonator is easily affected by a manufacturing error, and the manufacturing error may cause the directional coupler part to easily have a branch ratio deviating from a desired branch ratio. Thus, it is difficult to extract light having a desired wavelength at a high extinction ratio in the ring resonator.

Therefore, a wavelength filter that can cause an output wavelength to be variable by providing an electrode, that outputs light having multimodal wavelength peaks, and that is hardly affected by a manufacturing error is desired.

According to an aspect of the present invention, there is provided a wavelength filter including: an optical waveguide core that includes n (n is an integer greater than or equal to 2) number of mode conversion parts and n−1 number of cavity parts that are alternately connected to each other in series; and cladding that surrounds the optical waveguide core. The mode conversion parts convert light having a specific wavelength of a p-order mode (p is an integer satisfying p≥0) into light of a q-order mode (q is an integer satisfying q>p) and reflect the light. The cavity parts match phases of the light having the specific wavelength of the p-order mode propagating through the cavity part.

In addition, according to an aspect of the present invention, there is provided a wavelength filter including: an input waveguide core; a first optical waveguide core that includes n (n is an integer greater than or equal to 2) number of first mode conversion parts and n−1 number of first cavity parts that are alternately connected to each other in series; a second optical waveguide core that includes n number of second mode conversion parts and n−1 number of second cavity parts that are alternately connected to each other in series; and cladding that surrounds the input waveguide core, the first optical waveguide core, and the second optical waveguide core. The first optical waveguide core and the second optical waveguide core are connected to the input waveguide core in parallel. The first and the second mode conversion parts reflect light having a specific wavelength of a p-order mode (p is an integer satisfying p≥0). Light reflected by the first mode conversion part of the first optical waveguide core and light reflected by the second mode conversion part of the second optical waveguide core have opposite phases from each other. The first and the second cavity parts match phases of the light having the specific wavelength of the p-order mode propagating through the first and the second cavity parts.

Moreover, according to an aspect of the present invention, there is provided a wavelength filter including: an optical waveguide core that includes n (n is an integer greater than or equal to 2) number of conversion parts and n−1 number of cavity parts that are alternately connected in series; and cladding that surrounds the optical waveguide core. The conversion parts convert a TE polarized wave having a specific wavelength into a TM polarized wave and reflect the wave, and convert a TM polarized wave having a specific wavelength into a TE polarized wave and reflect the wave. The cavity parts match phases of TE polarized waves or TM polarized waves having a specific wavelength propagating through the cavity part.

According to the present invention described above, it is possible to provide a wavelength filter which can cause an output wavelength to be variable by providing an electrode, that outputs light having multimodal wavelength peaks, and that is hardly affected by a manufacturing error.

BRIEF DESCRIPTION OF THE DRAWINGS

FIG. 3 is a schematic plan view showing another first wavelength filter;
FIG. 7 is a schematic plan view showing a photonic crystal.

DETAILED DESCRIPTION OF THE EMBODIMENT(S)

Figure 1A:
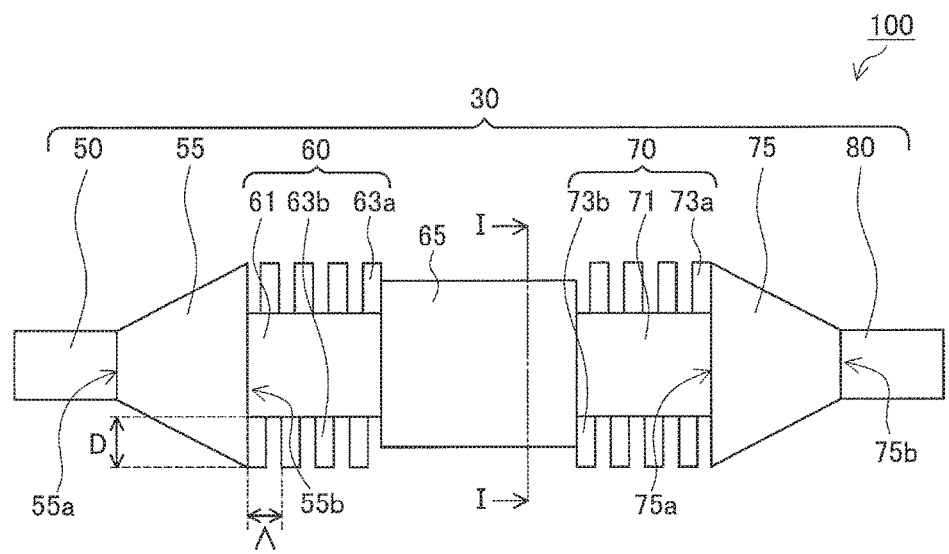
FIG. 1A is a schematic plan view showing a first wavelength filter.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

First Embodiment (First Wavelength Filter)

Figure 1B:
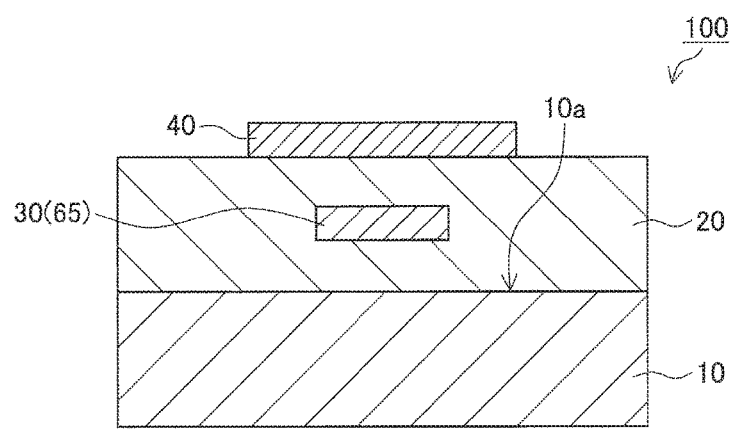
FIG. 1B is a schematic end view showing the first wavelength filter.

A wavelength filter according to a first embodiment of the present invention (hereinafter also referred to as a first wavelength filter) will be described with reference to FIGS. 1A and 1B. FIG. 1A is a schematic plan view showing the first wavelength filter. FIG. 1B is a schematic end view of the first wavelength filter shown in FIG. 1A taken along line I-I. Note that, in FIG. 1A, only an optical waveguide core to be described below is shown and the cladding or a support substrate is illustrated.

Note that a direction along a light propagation direction with respect to each structural element is defined as a length direction in the description below. In addition, a direction along thickness of the support substrate is defined as a thickness direction. Further, a direction which is orthogonal to the length direction and the thickness direction is defined as a width direction.

A first wavelength filter 100 is configured to include a support substrate 10, cladding 20, an optical waveguide core 30, and an electrode 40.

The support substrate 10 is configured to be a planar body using, for example, monocrystalline Si as a material.

The cladding 20 is formed on the support substrate 10 to cover an upper surface 10a of the support substrate 10 and surround the optical waveguide core 30. The cladding 20 is formed using, for example, $SiO_2$ as material.

The optical waveguide core 30 is formed using, for example, Si having a higher refractive index than the cladding 20 as material. As a result, the optical waveguide core 30 substantially functions as a light transmission path so that light input therein to propagate in a propagation direction in accordance with a planar shape of the optical waveguide core 30. In addition, it is preferable for the optical waveguide core 30 to be formed, for example, at least 1 μm away from the support substrate 10 in order to prevent propagating light from deviating toward the support substrate 10.

In addition, it is preferable to set the thickness of the optical waveguide core 30 to be, for example, in a range of 150 to 500 nm to fulfill a single mode condition for a TE polarized wave of propagating light.

Further, the optical waveguide core 30 is constituted by an input waveguide part 50, an input-side tapered part 55, an input-side mode conversion part 60, a cavity part 65, an output-side mode conversion part 70, an output-side tapered part 75, and an output waveguide part 80 that are connected in series in this order.

The input waveguide part 50 is set to have a width in which a single mode condition is fulfilled for propagating light of a TE polarized wave. Thus, the input waveguide part 50 causes light in a fundamental mode to propagate.

The input-side tapered part 55 has a width that is continuously expanded from one end 55a that is connected to the input waveguide part 50 toward the other end 55b that is connected to the input-side mode conversion part 60. In addition, a width of the one end 55a of the input-side tapered part 55 is set to be identical to the width of the input waveguide part 50. Thus, the input-side tapered part 55 is set such that a single mode condition is fulfilled for propagating light of the TE polarized wave at the one end 55a.

Gratings are formed throughout both side surfaces of the input-side mode conversion part 60. By using the gratings, the input-side mode conversion part 60 converts propagating light of an input TE polarized wave having a specific wavelength from the fundamental mode to a first-order mode and reflects the light. In addition, the input-side mode conversion part 60 transmits propagating light having the other wavelengths of the fundamental mode without mode conversion.

A phase matching condition of the grating is expressed by the following formula (1), where Λ represents a grating period, $n_0$ represents an equivalent refractive index with respect to a TE polarized wave of the fundamental mode, and $n_1$ represents an equivalent refractive index with respect to a TE polarized wave of the first-order mode.

$$2\pi/\Lambda = 2\pi(n_0+n_1)/\lambda \tag{1}$$

In the gratings, a TE polarized wave having a wavelength λ that satisfies the above formula (1), i.e., a Bragg wavelength, is subject to Bragg reflection.

The input-side mode conversion part 60 in which the gratings are formed is configured to include a base 61 and protrusions 63a and 63b that are integrated with each other. The base 61 is formed to stretch in a length direction of the input-side mode conversion part 60. The plurality of protrusions 63a is periodically formed on one side surface of the base 61. The plurality of protrusions 63b is periodically formed on the other side surface of the base 61. The protrusion 63a and 63b are formed at antisymmetric positions with the base 61 interposed therebetween. The period Λ of the protrusions 63a and 63b is designed such that the above formula (1) is satisfied with respect to the wavelength λ of light to be reflected.

Figure 2:
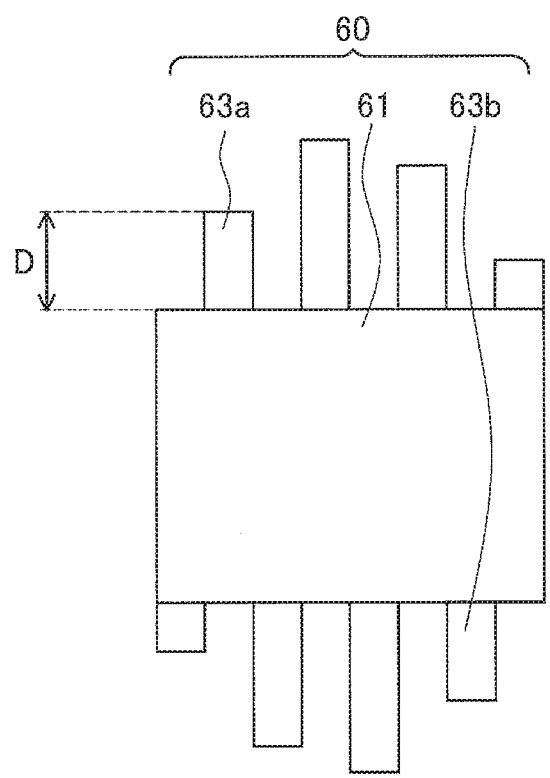
FIG. 2 is a schematic plan view showing a modified example of gratings.

Here, as a modified example of the gratings, a configuration in which protrusion amounts D of the protrusions 63a and 63b (dimensions of the protrusions 63a and 63b in the width direction) are unique and at least two or more values are set for the protrusion amounts D is possible. The modified example of the gratings will be described with reference to FIG. 2. FIG. 2 is a schematic plan view for describing the modified example of the gratings. Note that, in FIG. 2, the support substrate and the gratings are not illustrated.

In the configuration example shown in FIG. 2, the protrusion amounts D of the protrusions 63a and 63b change at each period. Here, the protrusion amounts D increase at each of the periods from the protrusion amounts D of the protrusions 63a and 63b of a first period. The protrusion amounts D of the protrusions 63a and 63b positioned near the middle of the gratings in the length direction are maximum. Then, the protrusion amounts D decrease from the protrusions 63a and 63b with the maximum protrusion amounts D.

Since the protrusions 63a and 63b have different values as their protrusion amounts D as described above, it is possible to prevent a shape of a peak of light passing through the gratings from being broken. Note that a variation of the protrusion amount D is designed in accordance with the wavelength λ of the light to be reflected and a desired transmission characteristic.

The cavity part 65 is formed to have a constant width. The width of the cavity part 65 is set such that the TE polarized waves of the fundamental mode and the first-order mode propagate.

The cavity part 65 matches phases of light having a specific wavelength out of light that propagates through the cavity part 65. A length of the cavity part 65 is designed in accordance with the wavelength whose phase is to be matched.

Gratings that are similar to those of the input-side mode conversion part 60 are formed throughout the output-side mode conversion part 70. By using the gratings, the output-side mode conversion part 70 converts propagating light of an input TE polarized wave having a specific wavelength from the fundamental mode to the first-order mode and reflects the light. In addition, the output-side mode conversion part 70 transmits propagating light having the other wavelengths of the fundamental mode without mode conversion.

A width of a base 71 and periods of protrusions 73a and 73b of the output-side mode conversion part 70 in which the gratings are formed are designed to satisfy the above formula (1) with respect to the wavelength λ of the light to be reflected under the same condition as that for the gratings of the input-side mode conversion part 60.

Note that lengths of the gratings of the output-side mode conversion part 70 can be set to be different from the lengths of the gratings of the input-side mode conversion part 60.

The output-side tapered part 75 has a width that is continuously reduced from one end 75a that is connected to the output-side mode conversion part 70 toward the other end 75b that is connected to the output waveguide part 80. In addition, the width of the other end 75b of the output-side tapered part 75 is set to be identical to a width of the output waveguide part 80. The output-side tapered part 75 is set such that a single mode condition is fulfilled for propagating light of the TE polarized wave at the other end 75b.

The output waveguide part 80 is set to have a width in which the single mode condition is fulfilled for propagating light of the TE polarized wave. Thus, the output waveguide part 80 causes light of the fundamental mode to propagate there through.

The electrode 40 is formed at a position at which the cavity part 65 is covered via the cladding 20. Joule heat can be generated by causing a current to flow in the electrode 40. Then, a refractive index of the cavity part 65 can be changed due to a thermo-optic effect brought about by the heating. As a result, the cavity part 65 can change a wavelength whose phase is to be matched.

In the first wavelength filter 100, light having a wavelength whose phase is matched in accordance with the length of the cavity part 65 is output from the output waveguide part 80, among the TE polarized waves that are input from the input waveguide part 50 and passes through the input-side mode conversion part 60 and the TE polarized waves that are reflected by the gratings of the output-side mode conversion part 70 and further reflected by the input-side mode conversion part 60i.

Meanwhile, light having a wavelength whose phase is matched in accordance with the length of the cavity part 65 is input to the input-side tapered part 55, among propagating light of the TE polarized waves in the first-order mode that has undergone mode conversion and reflection by the gratings of the input-side mode conversion part 60 and the output-side mode conversion part 70. The reflected light propagates through the input-side tapered part 55 toward the input waveguide part 50. However, the width of the one end 55a of the input-side tapered part 55 is set such that the single mode condition is satisfied for the TE polarized wave as described above. Thus, the reflected light is radiated without proceeding to the input waveguide part 50.

Therefore, the first wavelength filter 100 can be used as a wavelength filter which extracts light having a specific wavelength whose phase is to be matched by the cavity part 65.

In addition, by setting the cavity part 65 to have a length which causes light of the fundamental mode to have a phase of an integer multiple of π, phases of a plurality of wavelengths can be matched for the light of the fundamental mode propagating through the cavity part 65. Thus, the first wavelength filter 100 can output light having multimodal wavelength peaks.

In addition, the electrode 40 can apply heat to the cavity part 65 in the first wavelength filter 100. Thus, the cavity part 65 can change a wavelength whose phase is to be matched. Therefore, wavelengths output through the first wavelength filter 100 are variable.

Further, the first wavelength filter 100 can be regarded as a wavelength filter equivalent to a ring resonator. In this case, the gratings of the input-side mode conversion part 60 and the output-side mode conversion part 70 correspond to a directional coupler portion of a ring resonator. In addition, the cavity part 65 corresponds to a ring waveguide portion of the ring resonator. Here, the directional coupler portion of the ring resonator is easily affected by a manufacturing error as described above. On the other hand, the first wavelength filter 100 does not include the directional coupler. Thus, the first wavelength filter 100 is less affected by the manufacturing error than the ring resonator while having a function equivalent to the ring resonator.

Note that, in the present embodiment, the configuration of the first wavelength filter 100 that outputs light having a specific wavelength with respect to the TE polarized wave has been described. However, the first wavelength filter 100 can also be configured to output light having a specific wavelength with respect to a TM polarized wave. In this case, the gratings of the input-side mode conversion part 60 and the output-side mode conversion part 70 are designed such that the above formula (1) is satisfied for the TM polarized wave in accordance with the wavelength λ of the light to be reflected. In addition, the length of the cavity part 65 is set such that phases of wavelengths output from the output waveguide part 80 are matched, among TM polarized waves propagating through the cavity part 65.

Further, in the present embodiment, the configuration of the first wavelength filter 100 in which the gratings of the input-side mode conversion part 60 and the output-side mode conversion part 70 convert propagating light having a specific wavelength from the fundamental mode to the first-order mode and reflect the light has been described. However, a configuration in which the gratings of the input-side mode conversion part 60 and the output-side mode conversion part 70 convert light having a specific wavelength of a p-order mode (p is an integer satisfying p≥0) into light of a q-order mode (q is an integer satisfying q>p) and reflect the light is also possible. In this case, a phase matching condition of the gratings of the input-side mode conversion part 60 and the output-side mode conversion part 70 is expressed by the following formula (2), where Λ represents a grating period, $n_p$ represents an equivalent refractive index with respect to light of the p-order mode, and $n_q$ represents an equivalent refractive index with respect to light of the q-order mode.

$$2\pi/\Lambda = 2\pi(n_p+n_q)/\lambda \quad (2)$$

Light having the wavelength λ, i.e., the Bragg wavelength, which satisfies the above formula (2), undergoes Bragg reflection by the gratings. The gratings are designed such that the above formula (2) is satisfied with respect to the wavelength λ of the light to be reflected of the TE polarized wave or the TM polarized wave. In addition, the length of the cavity part 65 is set such that phases of wavelengths to be output through the output waveguide part 80 are matched, among light of the p-order mode propagating through the cavity part 65. Further, by setting the width of the one end 55a of the input-side tapered part 55 to be a width corresponding to the p-order mode, reflected light of the q-order mode can be radiated without proceeding to the input waveguide part 50.

In addition, in the present embodiment, the configuration in which the optical waveguide core 30 includes two mode conversion parts (the input-side mode conversion part 60 and the output-side mode conversion part 70) and one cavity part 65 has been described. However, a configuration in which the optical waveguide core 30 includes n (n is an integer greater than or equal to 2) number of mode conversion parts and n−1 number of cavity parts is also possible. The configuration in which the first wavelength filter includes n number of mode conversion parts and n−1 number of cavity parts will be described with reference to FIG. 3. FIG. 3 is a schematic plan view of another first wavelength filter (a wavelength filter 150) which includes n number of mode conversion parts and n−1 number of cavity parts. Note that, in FIG. 3, the support substrate and cladding are not illustrated.

n number of mode conversion parts 160 and n−1 number of cavity parts 165 are alternately connected to each other in series between the input-side tapered part 55 and the output-side tapered part 75.

Gratings that are similar to those of the above-described input-side mode conversion part 60 and the output-side mode conversion part 70 are formed throughout each of the mode conversion parts 160. By using the gratings, each of the mode conversion parts 160 converts input propagating light having a specific wavelength from the fundamental mode to the first-order mode and reflects the light. In addition, each of the mode conversion parts 160 transmits propagating light having the other wavelengths of the fundamental mode without mode conversion. A period of protrusions 163a and 163b of the gratings of each of the mode conversion parts 160 is designed such that the above formula (2) is satisfied with respect to the wavelength λ of the light to be reflected under the same condition as the gratings of the input-side mode conversion part 60.

Note that some or all of lengths of the gratings of each of the mode conversion parts 160 (i.e., a length of each mode conversion part) can be set to be different from each other. By including gratings with different lengths, a flat-top characteristic of a wavelength peak of transmitted light can be improved.

Each of the cavity parts 165 match phases of light having a specific wavelength in accordance with lengths of the cavity parts 165 among TE polarized waves propagating through the cavity parts 165.

By connecting the mode conversion parts 160 and the cavity parts 165 to each other in multiple stages as described above, a flat-top characteristic of a wavelength peak of light output from the output waveguide part 80 can be improved.

(Evaluation of Characteristic of First Wavelength Filter)

The inventor of the present invention conducted first and second simulations for evaluating characteristics of the first wavelength filter by using a finite difference time domain (FDTD) method.

First, in the first simulation, with respect to a first wavelength filter that includes 3 mode conversion parts and 2 cavity parts, output light obtained by inputting a TE polarized wave of the fundamental mode through the input waveguide part 50, transmitting the light through the mode conversion parts, and outputting the light from the output waveguide part 80, and output light obtained by reflecting the light by the mode conversion parts and outputting the light from the input waveguide part 50 are analyzed.

In the first simulation, the first wavelength filter is designed as below. That is, the optical waveguide core 30 is set to have an overall thickness of 0.2 μm. In addition, the input waveguide part 50 is set to have a width of 0.45 μm.

In addition, the input-side tapered part 55 is set to have a length of 5 µm and a width of the other end 55b is set to 0.5 µm. In addition, mode conversion parts that are positioned at both ends among the 3 mode conversion parts are each set to have a length of 17.19 µm, and a width of bases thereof is set to 0.37 µm through the length, and gratings whose protrusions are set to have a protrusion amount of 0.13 µm and a period of 0.382 µm are formed. In addition, a mode conversion part that is positioned at the center among the 3 mode conversion parts is set to have a length of 21.392 µm, a width of a base thereof was set to 0.37 µm through the length, and gratings whose protrusions are set to have a protrusion amount of 0.13 µm and a period of 0.382 µm are formed. In addition, the 2 cavity parts are each set to have a length of 25.594 µm and a width of 0.5 µm. In addition, the output-side tapered part 75 are set to have a length of 5 µm and a width of the one end 55a is 0.5 µm. In addition, the output waveguide part 80 is set to have a width of 0.45 µm.

Figure 4A:
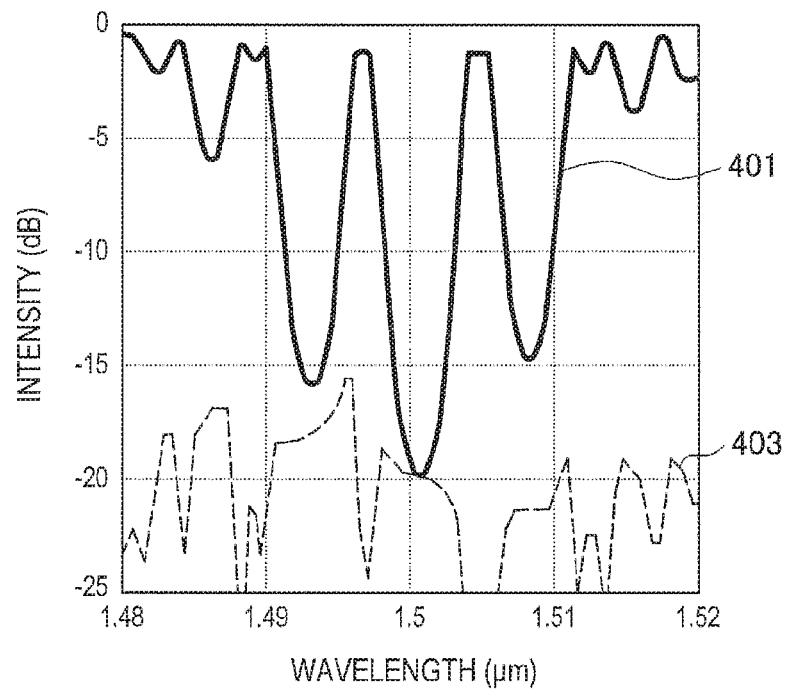
FIG. 4A is a graph showing a result of a first simulation.

A result of the first simulation is illustrated in FIG. 4A. In FIG. 4A, the vertical axis represents an intensity of output light on a dB scale, and the horizontal axis represents a wavelength in a unit of µm. In FIG. 4A, a curve 401 represents an intensity of light output from the output waveguide part 80, and a curve 403 represents an intensity of light output from the input waveguide part 50.

As illustrated in FIG. 4A, it can be ascertained that there are a plurality of flat-top wavelength peaks in the light output from the output waveguide part 80. In addition, it can be ascertained that the intensity of the light output from the input waveguide part 50 is sufficiently suppressed.

Next, in the second simulation, light output from the output waveguide part 80 and light output from the input waveguide part 50 are analyzed in a configuration example in which the protrusion amount of the protrusions of the gratings of each of the mode conversion parts is changed in every period (see FIG. 2). Here, a maximum protrusion amount of the protrusions is set to 0.2 µm. The other conditions are set to be similar to the above-described first simulation.

Figure 4B:
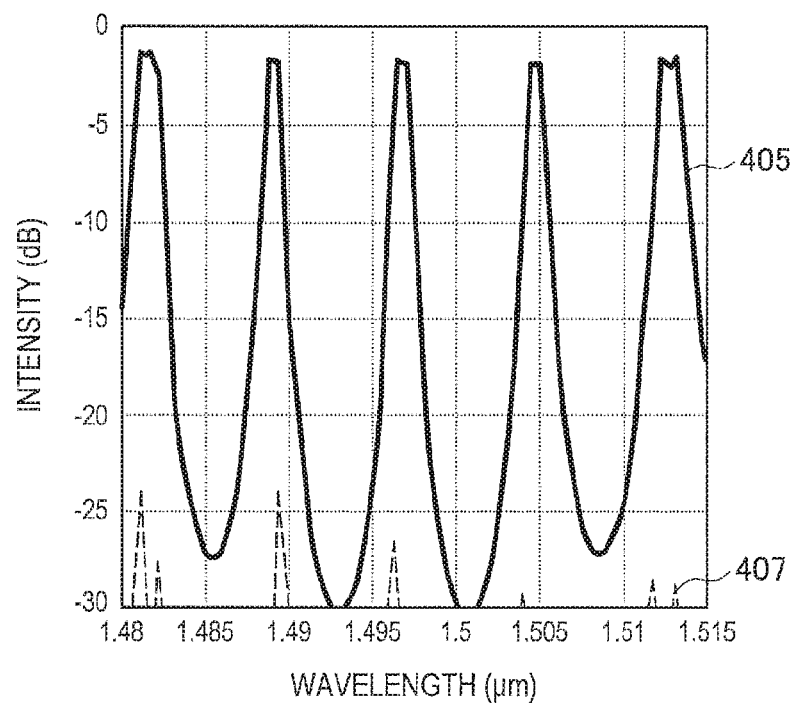
FIG. 4B is a graph showing a result of a second simulation.

A result of the second simulation is illustrated in FIG. 4B. In FIG. 4B, the vertical axis represents an intensity of output light on a dB scale, and the horizontal axis represents wavelengths in a unit of µm. In FIG. 4B, a curve 405 represents an intensity of the light output from the output waveguide part 80, and a curve 407 represents an intensity of the light output from the input waveguide part 50.

As illustrated in FIG. 4B, it can be ascertained that there are a plurality of flat-top wavelength peaks in the light output from the output waveguide part 80. In addition, it can be ascertained that an extinction ratio of the output light is higher and diffraction efficiency of the gratings is improved in comparison to the first simulation. Further, it can be ascertained that the intensity of the light output from the input waveguide part 50 is sufficiently suppressed.

Note that a slight light output from the input waveguide part 50 is found in the first and second simulations. However, the output is considered to be reduced by setting the length of the input-side tapered part 55 to be greater and inducing light radiation in the input-side tapered part 55.

Second Embodiment (Second Wavelength Filter)

Figure 5A:
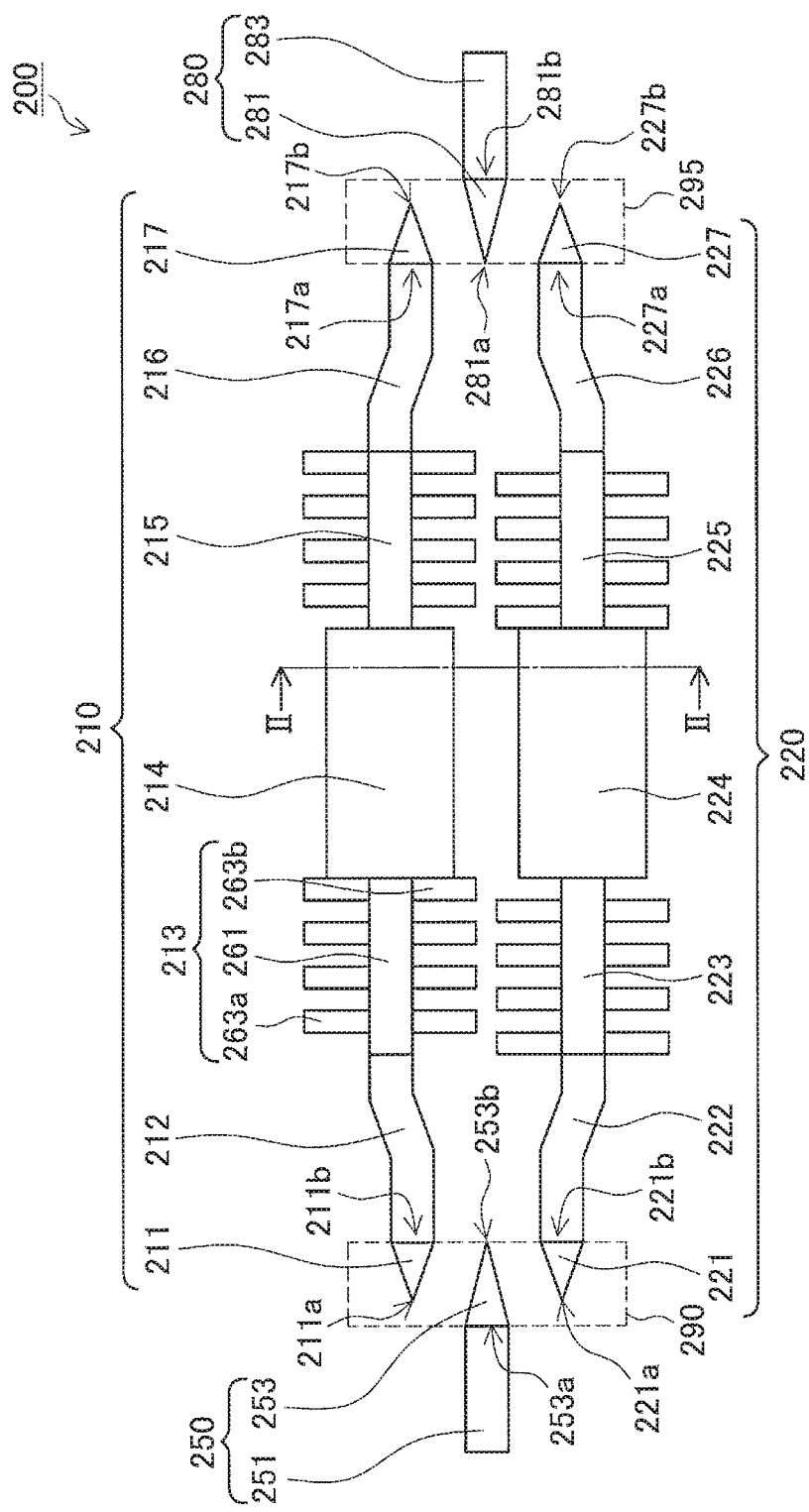
FIG. 5A is a schematic plan view showing a second wavelength filter.
Figure 5B:
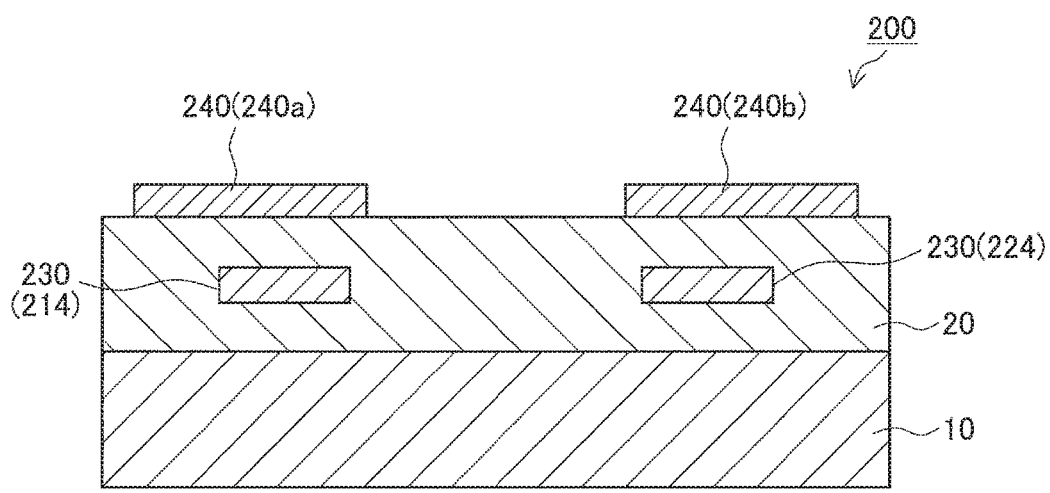
FIG. 5B is a schematic end view showing the second wavelength filter.

A wavelength filter according to a second embodiment of the invention (hereinafter also referred to as a second wavelength filter) will be described with reference to FIGS. 5A and 5B. FIG. 5A is a schematic plan view showing the second wavelength filter. FIG. 5B is a schematic end view showing the second wavelength filter of FIG. 5A taken along line II-II. In FIG. 5A, only an optical waveguide core is shown and the cladding and the support substrate are not illustrated. Note that the same reference numerals are given to structural elements common to those of the above-described first wavelength filters, and description thereof will be omitted.

A second wavelength filter 200 is configured to have a support substrate 10, cladding 20, optical waveguide cores 230, and electrodes 240.

The optical waveguide cores 230 are formed using, for example, Si having a higher refractive index than the cladding 20 as material. In addition, it is preferable to set a thickness of the optical waveguide cores 230 to, for example, 150 to 500 nm here so that a single mode condition is fulfilled for a TE polarized wave of propagating light.

In addition, the optical waveguide cores 230 are configured to include an input waveguide core 250, a first optical waveguide core 210, a second optical waveguide core 220, and an output waveguide core 280.

The input waveguide core 250 is constituted by an input waveguide part 251 and an input tapered part 253 that are connected in series in this order.

The first optical waveguide core 210 is constituted by a first input-side tapered part 211, a first input-side arm 212, a first input-side mode conversion part 213, a first cavity part 214, a first output-side mode conversion part 215, a first output-side arm 216, and a first output-side tapered part 217 that are connected in series in this order.

The second optical waveguide core 220 is constituted by a second input-side tapered part 221, a second input-side arm 222, a second input-side mode conversion part 223, a second cavity part 224, a second output-side mode conversion part 225, a second output-side arm 226, and a second output-side tapered part 227 that are connected in series in this order.

The output waveguide core 280 is constituted by an output tapered part 281 and an output waveguide part 283 that are connected in series in this order.

The first optical waveguide core 210 and the second optical waveguide core 220 are provided separately and parallel to each other.

In addition, an input-side coupling region 290 in which the input tapered part 253 of the input waveguide core 250, the first input-side tapered part 211 of the first optical waveguide core 210, and the second input-side tapered part 221 of the second optical waveguide core 220 are arranged in parallel is set. In the input-side coupling region 290, the first input-side tapered part 211 and the second input-side tapered part 221 are provided separately from the input tapered part 253 and parallel to the input tapered part 253, with the input tapered part 253 interposed therebetween. In addition, the input waveguide part 251 of the input waveguide core 250 is arranged on the opposite side to the first input-side arm 212 of the first optical waveguide core 210 and the second input-side arm 222 of the second optical waveguide core 220, across the input-side coupling region 290. In the input-side coupling region 290, the first optical waveguide core 210 and the second optical waveguide core 220 are connected to the input waveguide core 250 in parallel.

In addition, an output-side coupling region 295 in which the output tapered part 281 of the output waveguide core 280, the first output-side tapered part 217 of the first optical waveguide core 210, and the second output-side tapered part 227 of the second optical waveguide core 220 are arranged in parallel is set. In the output-side coupling region 295, the first output-side tapered part 217 and the second output-side tapered part 227 are provided separately from the output tapered part 281 and parallel to the output tapered part 281, with the output tapered part 281 interposed therebetween. In addition, the output waveguide part 283 of the output waveguide core 280 is arranged on the opposite side to the first output-side arm 216 of the first optical waveguide core 210 and the second output-side arm 226 of the second optical waveguide core 220, across the output-side coupling region 295. In the output-side coupling region 295, the first optical waveguide core 210 and the second optical waveguide core 220 are connected to the output waveguide core 280 in parallel.

The input waveguide part 251 is set to have a width which fulfills a single mode condition for a TE polarized wave.

The input tapered part 253 has a width that is continuously reduced from one end 253a that is connected to the input waveguide part 251 toward the other end 253b positioned at the side of the first optical waveguide core 210 and the second optical waveguide core 220. In addition, the width of the one end 253a of the input tapered part 253 is set to be identical to the width of the input waveguide part 251. Thus, the input tapered part 253 is set such that the single mode condition is fulfilled for propagating light of a TE polarized wave at the one end 253a.

The first input-side tapered part 211 has a width that is continuously expanded from one end 211a at the side of the input waveguide core 250 toward the other end 211b that is connected to the first input-side arm 212. In addition, the width of the other end 211b of the first input-side tapered part 211 is set such that the single mode condition is fulfilled for the TE polarized wave.

The first input-side arm 212 is set to have a width in which the single mode condition is fulfilled for the TE polarized wave.

Gratings are formed throughout both side surfaces of the first input-side mode conversion part 213. By using the gratings, the first input-side mode conversion part 213 reflects propagating light of an input TE polarized wave having a specific wavelength of a fundamental mode without mode conversion. In addition, the first input-side mode conversion part 213 transmits propagating light having the other wavelengths of the fundamental mode without mode conversion.

A phase matching condition of the gratings is expressed by the following formula (3), where Λ represents a grating period and $n_0$ represents an equivalent refractive index with respect to a TE polarized wave of the fundamental mode.

$$2\pi/\Lambda = 2\pi \cdot 2n_0/\lambda \quad (3)$$

The gratings perform Bragg-reflection on a TE polarized wave having a wavelength λ that satisfies the above formula (3), i.e., a Bragg wavelength.

The first input-side mode conversion part 213 in which gratings are formed is configured to include a base 261 and protrusions 263a and 263b that are integrated with each other. The base 261 is formed to have a constant width. The plurality of protrusions 263a is periodically formed on one side surface of the base 261. The plurality of protrusions 263b is periodically formed on the other side surface of the base 261. The protrusions 263a and 263b are formed at symmetric positions with the base 261 interposed therebetween. A protrusion amount D of the protrusions 263a and 263b and a period Λ of the protrusions 263a and 263b are designed to satisfy the above formula (3) with respect to the wavelength λ of light to be reflected.

Note that the gratings can be configured such that the protrusions 263a and 263b each have unique protrusion amounts D and at least two or more values are set for the protrusion amount D in a way similar to the above-described first wavelength filter (see FIG. 2).

The first cavity part 214 is formed to have a constant width. The width of the first cavity part 214 is set such that the single mode condition is fulfilled for the TE polarized wave.

The first cavity part 214 matches phases of light having a specific wavelength among TE polarized waves propagating through the first cavity part 214. A length of the first cavity part 214 is designed in accordance with a wavelength whose phase is to be matched.

Gratings that are similar to those of the first input-side mode conversion part 213 are formed in the first output-side mode conversion part 215. By using the gratings, the first output-side mode conversion part 215 reflects propagating light of an input TE polarized wave having a specific wavelength of the fundamental mode without mode conversion. In addition, the first output-side mode conversion part 215 allows propagating light having the other wavelengths of the fundamental mode to pass therethrough without mode conversion.

A protrusion amount and a period of protrusions of the first output-side mode conversion part 215 in which the gratings are formed are designed such that the above formula (3) is satisfied with respect to the wavelength λ of the light to be reflected under the same condition as the gratings of the first input-side mode conversion part 213.

Note that a length of the gratings of the first output-side mode conversion part 215 can be set to be different from the length of the gratings of the first input-side mode conversion part 213. By setting the gratings of the first input-side mode conversion part 213 and the first output-side mode conversion part 215 to have different lengths from each other, a flat-top characteristic of wavelength peaks of transmitted light can be improved.

The first output-side arm 216 is set to have a width that fulfills the single mode condition for the TE polarized wave.

The first output-side tapered part 217 has a width that is continuously reduced from one end 217a that is connected to the first output-side arm 216 toward the other end 217b at the side of the output waveguide core 280. In addition, the width of the one end 217a of the first output-side tapered part 217 is set such that the single mode condition is fulfilled for the TE polarized wave.

The second input-side tapered part 221 has a width that is continuously expanded from one end 221a at the side of the input waveguide core 250 toward the other end 221b that is connected to the second input-side arm 222. In addition, the width of the other end 221b of the second input-side tapered part 221 is set such that the single mode condition is fulfilled for the TE polarized wave.

In addition, the second input-side tapered part 221 is formed with an identical design to the first input-side tapered part 211 of the first optical waveguide core 210. Further, the second input-side tapered part 221 is arranged at a position symmetric to the first input-side tapered part 211 with the input tapered part 253 interposed therebetween. As a result, light of the TE polarized wave in the fundamental mode propagating through the input waveguide core 250 is split into two beams through the input tapered part 253 in the input-side coupling region 290 and proceeds to the first input-side tapered part 211 and the second input-side tapered part 221.

The second input-side arm 222 is set to have a width that fulfills the single mode condition for the TE polarized wave.

The second input-side mode conversion part 223, the second cavity part 224, and the second output-side mode conversion part 225 are formed under the same conditions as the first input-side mode conversion part 213, the first cavity part 214, and the first output-side mode conversion part 215 of the first optical waveguide core 210. Thus, gratings that are similar to those of the first input-side mode conversion part 213 are formed throughout the second input-side mode conversion part 223. In addition, the second cavity part 224 is set to have the width and length identical with the first cavity part 214. Further, gratings that are similar to those of the first output-side mode conversion part 215 are formed throughout the second output-side mode conversion part 225.

In addition, the gratings of the first input-side mode conversion part 213 and the gratings of the second input-side mode conversion part 223 are formed to have grating periods (formation periods of the protrusions) that are deviated a half period from each other. In addition, the gratings of the first output-side mode conversion part 215 and the gratings of the second output-side mode conversion part 225 are formed to have grating periods that are deviated a half period from each other.

The second output-side arm 226 is set to have a width that fulfills the single mode condition for the TE polarized wave.

The second output-side tapered part 227 has a width that is continuously reduced from one end 227a that is connected to the second output-side arm 226 toward the other end 227b at the side of the output waveguide core 280. In addition, the width of the one end 227a of the second output-side tapered part 227 is set such that the single mode condition is fulfilled for the TE polarized wave.

Further, the second output-side tapered part 227 is formed i with an identical design to the first output-side tapered part 217 of the first optical waveguide core 210. In addition, the second output-side tapered part 227 is arranged a position symmetric to the first output-side tapered part 217 with the output tapered part 281 interposed therebetween. As a result, light of the TE polarized wave in the fundamental mode propagating through the first output-side tapered part 217 and the second output-side tapered part 227 proceeds to the output tapered part 281 in the output-side coupling region 295.

The output tapered part 281 has a width that is continuously expanded from one end 281a at the side of the first optical waveguide core 210 and the second optical waveguide core 220 toward the other end 281b that is connected to the output waveguide part 283. In addition, the width of the other end 281b of the output tapered part 281 is set such that a single mode condition is fulfilled for propagating light of the TE polarized wave.

The output waveguide part 283 is set to have a width that fulfills the single mode condition for the TE polarized wave.

The electrodes 240 are formed at positions at which the first cavity part 214 and the second cavity part 224 are covered via the cladding 20. Here, the electrode 240a is provided at a position at which the first cavity part 214 is covered, and the electrode 240b is provided at a position at which the second cavity part 224 is covered. Joule heat can be generated by causing a current to flow in the electrodes 240. Then, refractive indices of the first cavity part 214 and the second cavity part 224 can be changed due to a thermo-optic effect brought about by the heating. As a result, the first cavity part 214 and the second cavity part 224 can change a wavelength whose phase is to be matched.

In the second wavelength filter 200, light input from the input waveguide part 251 of the input waveguide core 250 is split into two beams through the input tapered part 253 in the input-side coupling region 290, and proceeds to the first input-side tapered part 211 of the first optical waveguide core 210 and the second input-side tapered part 221 of the second optical waveguide core 220.

Light of the TE polarized wave of the fundamental mode satisfying the above formula (3) out of light propagating through the first optical waveguide core 210 is reflected by the gratings of the first input-side mode conversion part 213 and the first output-side mode conversion part 215. Light having the wavelength whose phase is matched in accordance with the length of the first cavity part 214 passes through the first output-side arm 216 and the output-side coupling region 295 and is output from the output waveguide part 283 of the output waveguide core 280, among TE polarized waves transmitted by the gratings of the first input-side mode conversion part 213 and TE polarized waves that are reflected by the gratings of the first output-side mode conversion part 215 and reflected by the gratings of the first input-side mode conversion part 213. Meanwhile, the light having the wavelength whose phase is matched in accordance with the length of the first cavity part 214 out of the TE polarized waves of the fundamental mode reflected by the gratings of the first input-side mode conversion part 213 and the first output-side mode conversion part 215 passes through the first input-side arm 212 and is input to the first input-side tapered part 211.

Also in the second optical waveguide core 220, light having a wavelength whose phase is matched in accordance with a length of the second cavity part 224 out of TE polarized waves transmitted by the gratings of the second input-side mode conversion part 223 and TE polarized waves that are reflected by the gratings of the second output-side mode conversion part 225 and reflected by the gratings of the second input-side mode conversion part 223 passes through the second output-side arm 226 and the output-side coupling region 295, and is output from the output waveguide part 283 of the output waveguide core 280, in a way similar to the first optical waveguide core 210. Meanwhile, the light having the wavelength whose phase is matched in accordance with the length of the second cavity part 224 out of light of a TE polarized wave of the fundamental mode reflected by the gratings of the second input-side mode conversion part 223 and the second output-side mode conversion part 225 passes through the second input-side arm 222 and is input to the second input-side tapered part 221.

As described above, the gratings of the first input-side mode conversion part 213 and the gratings of the second input-side mode conversion part 223 are formed to be deviated a half period from each other. Also, the gratings of the first output-side mode conversion part 215 and the gratings of the second output-side mode conversion part 225 are formed to be deviated a half period from each other. For this reason, phases of light reflected by the gratings of the first input-side mode conversion part 213 and the first output-side mode conversion part 215 and input to the first input-side tapered part 211 and light reflected by the gratings of the second input-side mode conversion part 223 and the second output-side mode conversion part 225 and input to the second input-side tapered part 221 are deviated by $\pi$ from each other (i.e., the reflected light beams have opposite phases from each other). Thus, the reflected light input to the first input-side tapered part 211 and the reflected light input to the second input-side tapered part 221 are cancelled by each other without proceeding to the input waveguide core 250.

Therefore, the second wavelength filter 200 can be used as a wavelength filter that extracts light having a specific wavelength whose phase is to be matched by the first cavity part 214 and the second cavity part 224.

In addition, by causing the first cavity part 214 and the second cavity part 224 to have a length by which light of the fundamental mode has a phase that is an integer multiple of π, it is possible to match phases of a plurality of wavelength of light propagating through the first cavity part 214 and the second cavity part 224. Thus, the second wavelength filter 200 can output light having multimodal wavelength peaks.

Further, the electrodes 240 can apply heat to the first cavity part 214 and the second cavity part 224 in the second wavelength filter 200. Accordingly, the first cavity part 214 and the second cavity part 224 can change wavelengths whose phases are to be matched. Therefore, the second wavelength filter 200 can cause an output wavelength to be variable.

In addition, in a way similar to the first wavelength filter 100, the second wavelength filter 200 can be regarded as a wavelength filter equivalent to a ring resonator. Furthermore, no directional coupler is included as a structural element in the first input-side mode conversion part 213, the first cavity part 214, the first output-side mode conversion part 215, the second input-side mode conversion part 223, the second cavity part 224, and the second output-side mode conversion part 225, which substantially function to select an output wavelength. Therefore, the second wavelength filter 200 is less affected by a manufacturing error than the ring resonator while having a function equivalent to the ring resonator.

Note that, in the present embodiment, the configuration of the second wavelength filter 200 that outputs light having a specific wavelength with respect to the TE polarized wave has been described. However, the second wavelength filter 200 can also be configured to output light having a specific wavelength with respect to a TM polarized wave. In this case, the gratings of the first input-side mode conversion part 213, the first output-side mode conversion part 215, the second input-side mode conversion part 223, and the second output-side mode conversion part 225 are designed to satisfy the above formula (3) with respect to the TM polarized wave in accordance with the wavelength λ of the light to be reflected. In addition, the length of the first cavity part 214 and the second cavity part 224 is set such that a phase of 1 a wavelength output from the output waveguide part 283 among the TM polarized waves propagating through the first cavity part 214 and the second cavity part 224 is matched.

In addition, in the present embodiment, the configuration of the second wavelength filter 200 in which the gratings of the first input-side mode conversion part 213, the first output-side mode conversion part 215, the second input-side mode conversion part 223, and the second output-side mode conversion part 225 reflect propagating light having a specific wavelength of the fundamental mode without mode conversion has been described. However, the gratings can also be configured to reflect light having a specific wavelength of the p-order mode (p is an integer satisfying p≥0) without mode conversion. In this case, a phase-matching condition of the gratings is expressed by the following formula (4, where Λ represents a grating period and $n_p$ represents an equivalent refractive index with respect to light of the p-order mode.

The gratings perform Bragg-reflection on light having the wavelength λ satisfying the above formula (4), i.e., a Bragg wavelength. The gratings are designed such that the above formula (4) is satisfied with respect to the wavelength λ of light to be reflected of the TE polarized wave or the TM polarized wave. A length of each of the cavity parts 214 and 224 is set such that phases of the wavelengths to be output from the output waveguide part 283 among the light propagating through the cavity parts 214 and 224 are matched. Also in this case, light of the p-order mode input to the first input-side tapered part 211 and reflected by the gratings of the first input-side mode conversion part 213 and the first output-side mode conversion part 215 and light of the p-order mode input to the second input-side tapered part 221 and reflected by the gratings of the second input-side mode conversion part 223 and the second output-side mode conversion part 225 have phases that are deviated by π from each other (i.e., the light beams have opposite phases from each other). For this reason, the reflected light input to the first input-side tapered part 211 and the reflected light input to the second input-side tapered part 221 are cancelled by each other without proceeding to the input waveguide core 250.

Furthermore, also in the second wavelength filter 200, the first optical waveguide core 210 can include n (n is an integer greater than or equal to 2) number of mode conversion parts and n−1 number of cavity parts that are alternately connected to each other in series, and the second optical waveguide core 220 can include n number of mode conversion parts and n−1 number of cavity parts that are alternately connected to each other in series.

In this case, the n number of mode conversion parts and the n−1 number of cavity parts are alternately connected to each other in series between the first input-side arm 212 and the first output-side arm 216 in the first optical waveguide core 210. In addition, the n number of mode conversion parts and the n−1 number of cavity parts are alternately connected to each other in series between the second input-side arm 222 and the second output-side arm 226 in the second optical waveguide core 220. Gratings of each of the mode conversion parts are designed such that the above formula (4) is satisfied for the wavelength λ of the light to be reflected. Further, gratings of the mode conversion parts of the first optical waveguide core 210 and gratings of the mode conversion parts of the second optical waveguide core 220 are formed to be deviated a half period from each other.

Figure 6:
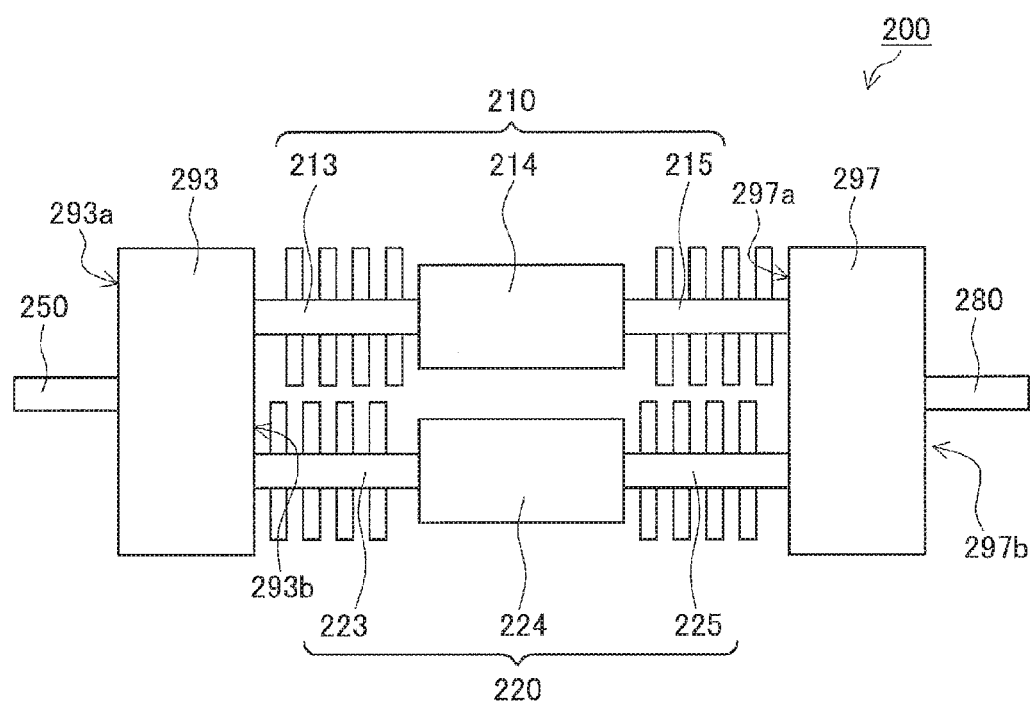
FIG. 6 is a schematic plan view showing another second wavelength filter.

Furthermore, in the present embodiment, the configuration in which the input tapered part 253, the first input-side tapered part 211, and the second input-side tapered part 221 included in the input-side coupling region 290 optically connect the input waveguide core 250, the first optical waveguide core 210, and the second optical waveguide core 220 has been described. In addition, the configuration in which the first output-side tapered part 217, the second output-side tapered part 227, and the output tapered part 281 included in the output-side coupling region 295 optically connect the first optical waveguide core 210, the second optical waveguide core 220, and the output waveguide core 280 has been described. However, a multi-mode interference (MMI) coupler can also be used to connect the waveguide cores. A configuration of another second wavelength filter including the MMI coupler will be described with reference to FIG. 6. FIG. 6 is a schematic plan view showing the second wavelength filter (a wavelength filter 250) including $$2\pi/\Lambda = 2\pi \cdot 2n_p/\lambda \quad (4)$$

the MMI coupler. Note that, in FIG. 6, the support substrate and cladding are not illustrated.

In a configuration example of including the MMI coupler, an input-side MMI coupler 293 is provided instead of the input tapered part 253, the first input-side tapered part 211, and the second input-side tapered part 221 (see FIG. 5A) included in the above-described input-side coupling region 290. In addition, an output-side MMI coupler 297 is provided instead of the first output-side tapered part 217, the second output-side tapered part 227 and the output tapered part 281 (see FIG. 5A) included in the output-side coupling region 295. Furthermore, the configuration example illustrated in FIG. 6 does not include the first input-side arm 212, the first output-side arm 216, the second input-side arm 222, or the second output-side arm 226.

In the configuration example of including the MMI couplers, the input-side MMI coupler 293 is provided instead of the input tapered part 253, the first input-side tapered part 211, and the second input-side tapered part 221 (see FIG. 5A) included in the above-described input-side coupling region 290. In addition, the output-side MMI coupler 297 is provided instead of the first output-side tapered part 217, the second output-side tapered part 227, and the output tapered part 281 (see FIG. 5A) included in the output-side coupling region 295.

The input-side MMI coupler 293 and the output-side MMI coupler 297 are set to have a width and a length to achieve a branch ratio of 3 dB with respect to the TE polarized wave or the TM polarized wave of the fundamental mode.

One end 293a of the input-side MMI coupler 293 is connected to the input waveguide part 251. In addition, the other end 293b of the input-side MMI coupler 293 at the opposite side of the one end 293a is connected to the first input-side mode conversion part 213 and the second input-side mode conversion part 223 in parallel. The input waveguide part 251, the first input-side mode conversion part 213, and the second input-side mode conversion part 223 are positioned so that light split into two light beams by inputting light from the input waveguide part 251 to the input-side MMI coupler 293 proceeds to the first input-side mode conversion part 213 and the second input-side mode conversion part 223. The input-side MMI coupler 293 connects the first optical waveguide core 210 and the second optical waveguide core 220 to the input waveguide core 250 in parallel.

One end 297a of the output-side MMI coupler 297 is connected to the first output-side mode conversion part 215 and the second output-side mode conversion part 225 in parallel. In addition, the other end 297b of the output-side MMI coupler 297 at the opposite side of the one end 297a is connected to the output waveguide core 280. The first output-side mode conversion part 215, the second output-side mode conversion part 225, and the output waveguide core 280 are positioned so that the light beams that are input from the first output-side mode conversion part 215 and the second output-side mode conversion part 225 to the output-side MMI coupler 297 and that are multiplexed proceed to the output waveguide core. The output-side MMI coupler 297 connects the first optical waveguide core 210 and the second optical waveguide core 220 to the output waveguide core 280 in parallel.

Further, the second wavelength filter 200 can also include a photonic crystal formed in each of the first input-side mode conversion part 213, the first output-side mode conversion part 215, the second input-side mode conversion part 223, and the second output-side mode conversion part 225 instead of the gratings. A configuration in which a photonic crystal is formed in a first input-side mode conversion part, a first output-side mode conversion part, a second input-side mode conversion part, and a second output-side mode conversion part will be described with reference to FIG. 7. FIG. 7 is a schematic plan view showing a first input-side mode conversion part, a first cavity part, a first output-side mode conversion part, a second input-side mode conversion part, a second cavity part, and a second output-side mode conversion part in the case where a photonic crystal is formed. Note that, in FIG. 7, the support substrate and cladding are not illustrated.

In the configuration example in which the photonic crystal is used, a first input-side mode conversion part 218, the first cavity part 214, a first output-side mode conversion part 219, a second input-side mode conversion part 228, the second cavity part 224, and a second output-side mode conversion part 229 can be formed to have constant widths.

The photonic crystal is formed such that a plurality of holes 240 are periodically formed in the first input-side mode conversion part 218, the first output-side mode conversion part 219, the second input-side mode conversion part 228, and the second output-side mode conversion part 229 in their length directions. Each of the holes 240 is formed to penetrate the first input-side mode conversion part 218, the first output-side mode conversion part 219, the second input-side mode conversion part 228, and the second output-side mode conversion part 229 in their thickness directions.

The photonic crystal performs Bragg-reflection on light having the wavelength $\lambda$ satisfying the above formula (4), i.e., a Bragg wavelength. In addition, a period $\Lambda$ of the holes 240 is designed such that the above formula (4) is satisfied with respect to the wavelength $\lambda$ of light to be reflected. As a result, the photonic crystal reflects input propagating light having a specific wavelength of the p-order mode without mode conversion. In addition, the photonic crystal transmits propagating light having the other wavelengths of the p-order mode without mode conversion.

The photonic crystal of the first input-side mode conversion part 218 and the photonic crystal of the second input-side mode conversion part 228 have the holes 240 formed at positions that are deviated a half period from each other. In addition, the photonic crystal of the first output-side mode conversion part 219 and the photonic crystal of the second output-side mode conversion part 229 have the holes 240 formed at positions that are deviated a half period from each other. Thus, as in a case of the gratings, light reflected by the photonic crystals of the first input-side mode conversion part 218 and the first output-side mode conversion part 219 have phases that are deviated by $\pi$ from light reflected by the photonic crystals of the second input-side mode conversion part 228 and the second output-side mode conversion part 229 (i.e., the reflected light beams have opposite phases from each other).

Note that lengths of the photonic crystal (i.e., the number of the holes 240) can also be set to be different between some or all of the mode conversion parts of the first optical waveguide core 210 and some or all of the mode conversion parts of the second optical waveguide core 220. By including photonic crystals having different lengths from each other, a flat-top characteristic of a wavelength peak of transmitted light can be improved.

(Evaluation of Characteristic of Second Wavelength Filter)

The inventor conducted a third and fourth simulations for evaluating a characteristic of the second wavelength filter by using the finite differential time domain (FDTD) method.

First, in the third simulation for the second wavelength filter in which the first optical waveguide core 210 and the second optical waveguide core 220 each have three mode conversion parts and two cavity parts, a TE polarized wave of the fundamental mode is input through the input waveguide part 251, and light transmitted by the mode conversion parts and output from the output waveguide core 280 and light reflected by the mode conversion parts and output from the input waveguide part 251 are analyzed.

In the third simulation, the second wavelength filter is designed as follows. That is, the optical waveguide core 230 is set to have an overall thickness of 0.2 µm. In addition, the input waveguide part 251 is set to have a width of 0.45 µm. In addition, the other end 253b of the input tapered part 253 is set to have a width of 0.2 µm. In addition, the one ends 211a and 221a of the first input-side tapered part 211 and the second input-side tapered part 221 are set to have a width of 0.2 µm, and the other ends of 211b and 221b thereof are set to have a width of 0.45 µm. In addition, both a separation distance between the first input-side tapered part 211 and the input tapered part 253 and a separation distance of the second input-side tapered part 221 and the input tapered part 253 are set to have a constant value of 0.1 µm.

Furthermore, mode conversion parts positioned at both ends of the first optical waveguide core 210 among the three mode conversion parts are each set to have a length of 5.46 µm, and gratings thereof are formed with a period of 0.364 µm throughout the entire length. In addition, a mode conversion part positioned at the center of the first optical waveguide core 210 among the three mode conversion parts is set to have a length of 8.726 µm, and gratings thereof are formed with a period of 0.364 µm throughout the entire length. Each of the gratings are configured to have protrusions whose protrusion amounts are changed at every period (see FIG. 2), and a maximum protrusion amount of the protrusions is set to 0.2 µm. In addition, each of the two cavity parts of the first optical waveguide core 210 are set to have a length of 12.012 µm and a width of 0.45 µm. In addition, the three mode conversion parts and the two cavity parts of the second optical waveguide core 220 are configured in a way similar to the first optical waveguide core 210.

In addition, the one end 281a of the output tapered part 281 is set to have a width of 0.2 µm. In addition, the first output-side tapered part 217 and the second output-side tapered part 227 are set to have the one ends 217a and 227a having a width of 0.45 µm and the other ends 217b and 227b having a width of 0.2 µm. In addition, a separation distance between the first output-side tapered part 217 and the output tapered part 281 and a separation distance between the second output-side tapered part 227 and the output tapered part 281 are set to have a constant value of 0.1 µm. In addition, the output waveguide part 283 is set to have a width of 0.45 µm.

Note that, in the third simulation, the first input-side arm 212, the first output-side arm 216, the second input-side arm 222, and the second output-side arm 226 are omitted.

Figure 8:
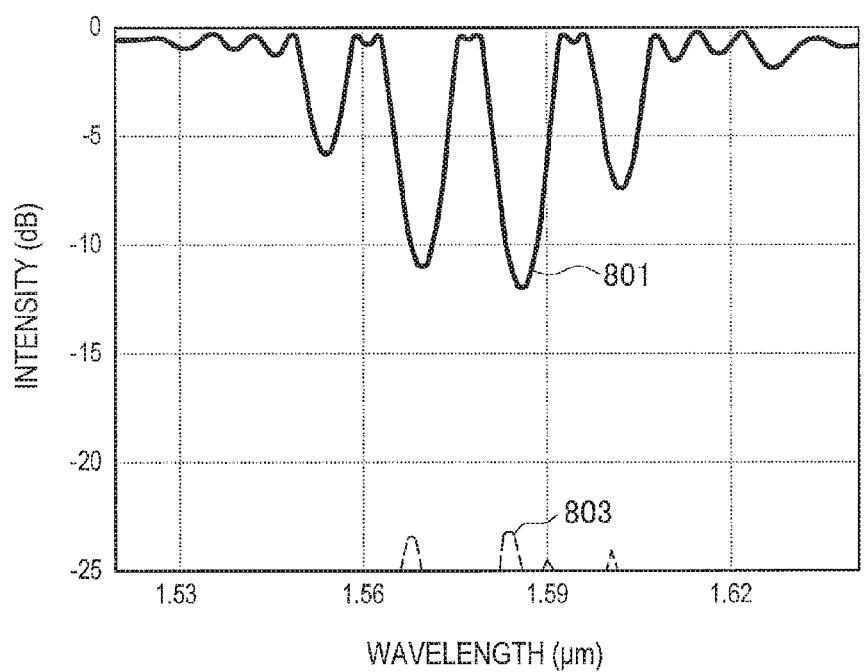
FIG. 8 is a graph showing a result of a third simulation.

A result of the third simulation is shown in FIG. 8. In FIG. 8, the vertical axis represents an intensity of output light on a dB scale and the horizontal axis represents a wavelength in a unit of µm. In FIG. 8, a curve 801 represents an intensity of light output from the output waveguide part 283 and a curve 803 represents an intensity of light output from the input waveguide part 251.

As illustrated in FIG. 8, it can be ascertained that there are a plurality of flat-top wavelength peaks in the light output from the output waveguide part 283. In addition, it can be ascertained that the intensity of the light output from the input waveguide part 251 is sufficiently suppressed.

Note that, a slight light output from the input waveguide part 251 is found in the third simulation. However, the output is considered to be reduced by setting the length of the input-side coupling region 290 to be greater and inducing light radiation.

Next, in the fourth simulation for the second wavelength filter in which the first optical waveguide core 210 and the second optical waveguide core 220 each have three mode conversion parts and two cavity parts and a photonic crystal is formed in each of the mode conversion parts (see FIG. 7), light output from the output waveguide part 283 is analyzed.

In the fourth simulation, the second wavelength filter is designed as follows. That is, the optical waveguide core 230 is set to have an overall thickness of 0.2 µm. In addition, the input waveguide part 251 is set to have a width of 0.45 µm. In addition, the other end 253b of the input tapered part 253 is set to have a width of 0.2 µm. In addition, the first input-side tapered part 211 and the second input-side tapered part 221 are set to have one ends 211a and 221a having a width of 0.2 µm and the other ends 211b and 221b having a width of 0.45 µm. In addition, a separation distance between the first input-side tapered part 211 and the input tapered part 253 and a separation distance between the second input-side tapered part 221 and the input tapered part 253 are set to have a constant value of 0.1 µm.

Furthermore, mode conversion parts positioned at both ends of the first optical waveguide core 210 among the three mode conversion part are set to have a length of 1.167 µm, and three holes are formed therein with a period of 0.389 µm. In addition, a mode conversion part positioned at the center of the first optical waveguide core 210 among the three mode conversion part is set to have a length of 2.334 µm and 6 holes are formed therein with a period of 0.389 µm. In addition, each of the two cavity parts of the first optical waveguide core 210 is formed to have a length of 23.34 µm. In addition, the three mode conversion parts and the two cavity parts of the first optical waveguide core 210 are set to have a constant width of 0.6 µm. In addition, three mode conversion parts and two cavity parts of the second optical waveguide core 220 are formed in the same manner as the first optical waveguide core 210. In addition, separation distances between the mode conversion parts and the cavity parts of the first optical waveguide core 210 and the mode conversion parts and the cavity parts of the second optical waveguide core 220 are set to 0.25 µm.

In addition, the one end 281a of the output tapered part 281 is set to have a width of 0.2 µm. In addition, the first output-side tapered part 217 and the second output-side tapered part 227 are set to have the one ends 217a and 227a having a width of 0.45 µm and the other ends 217b and 227b having a width of 0.2 µm. In addition, a separation distance between the first output-side tapered part 217 and the output tapered part 281 and a separation distance between the second output-side tapered part 227 and the output tapered part 281 are set to have a constant value of 0.1 µm. In addition, the output waveguide part 283 is set to have a width of 0.45 µm.

Furthermore, the first input-side arm 212 is set to have a tapered shape in which its width is continuously expanded from the width of the other end 211b of the first input-side tapered part 211 toward the width of the mode conversion part. In addition, the second input-side arm 222 is set to have a tapered shape in which its width is continuously expanded from the width of the other end 221b of the second input-side tapered part 221 toward the width of the mode conversion part. In addition, the first output-side arm 216 is set to have a tapered shape in which its width is continuously reduced from the width of the mode conversion part toward the width of the one end 217a of the first output-side tapered part 217. In addition, the second output-side arm 226 is set to have a tapered shape in which its width was continuously reduced from the width of mode conversion part toward the width of the one end 227a of the second output-side tapered part 227.

Figure 9:
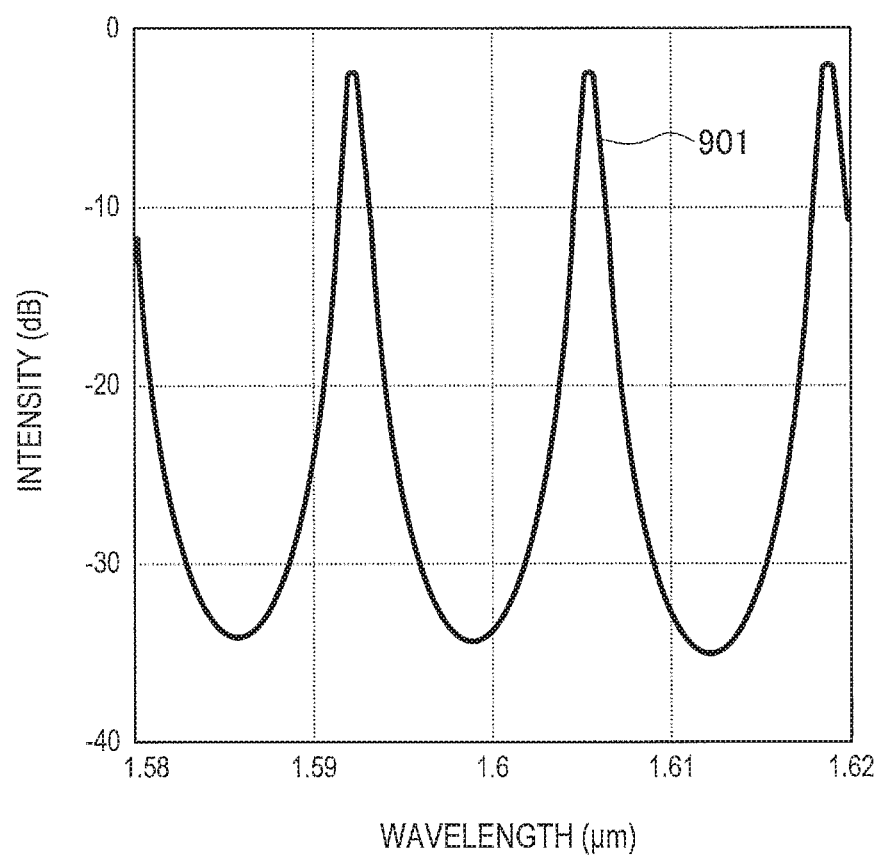
FIG. 9 is a graph showing a result of a fourth simulation.

A result of the fourth simulation is shown in FIG. 9. In FIG. 9, the vertical axis represents an intensity of output light on a dB scale and the horizontal axis represents a wavelength in a unit of µm. In FIG. 9, a curve 901 represents an intensity of light output from the output waveguide part 283.

As illustrated in FIG. 9, a plurality of flat-top wavelength peaks can be found in the light output from the output waveguide part 283.

The wavelength filter according to the above-described embodiment can be used as a wavelength filter which outputs light having a wavelength whose phase is matched in accordance with a length of a cavity part. In addition, the wavelength filter according to the above-described embodiment can change a wavelength whose phase is matched by the cavity parts, with respect to light transmitted through the mode conversion parts when an electrode that applies a voltage or a current to the cavity parts is provided. Furthermore, the wavelength filter according to the above-described embodiment is less affected by a manufacturing error than the ring resonator while having a function equivalent to the ring resonator since it the wavelength filter according to the above-described embodiment does not include a directional coupler.

Third Embodiment

Figure 10A:
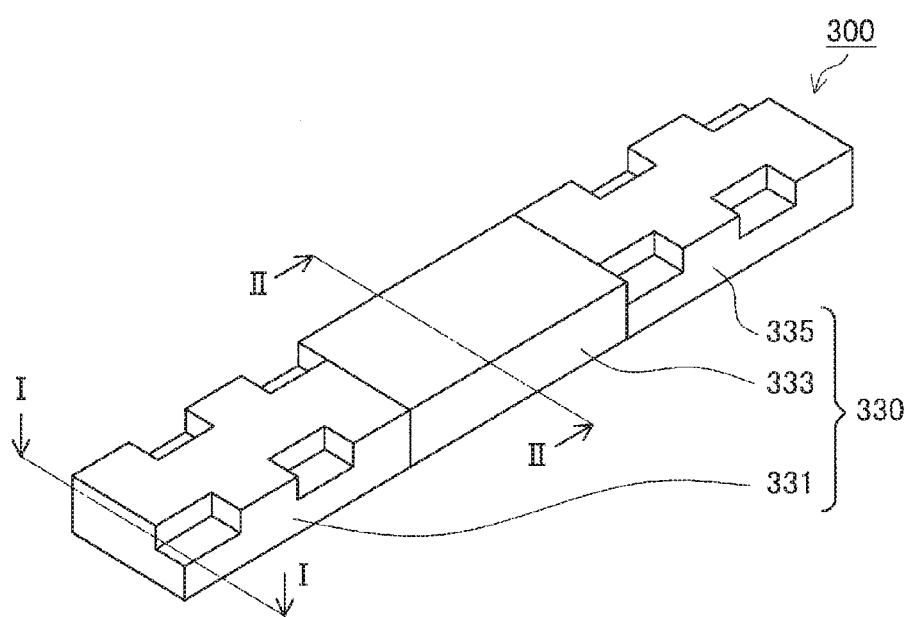
FIG. 10A is a schematic perspective view showing a third wavelength filter.
Figure 10B:
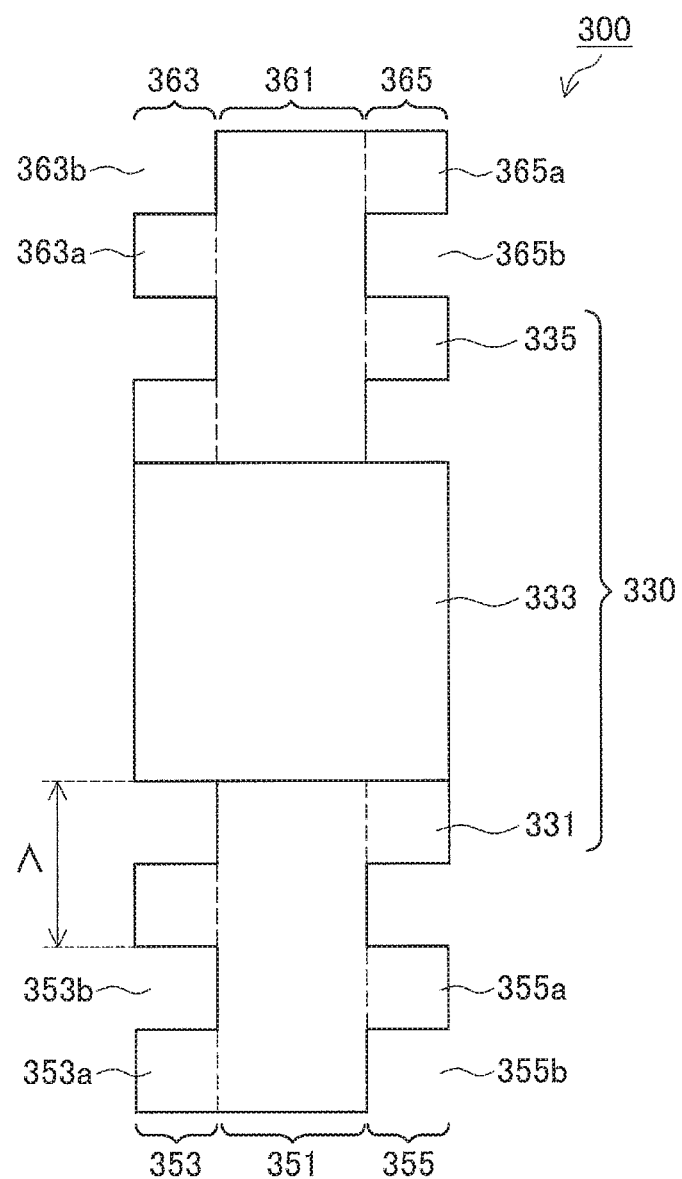
FIG. 10B is a schematic end view showing the third wavelength filter.
Figure 10C:
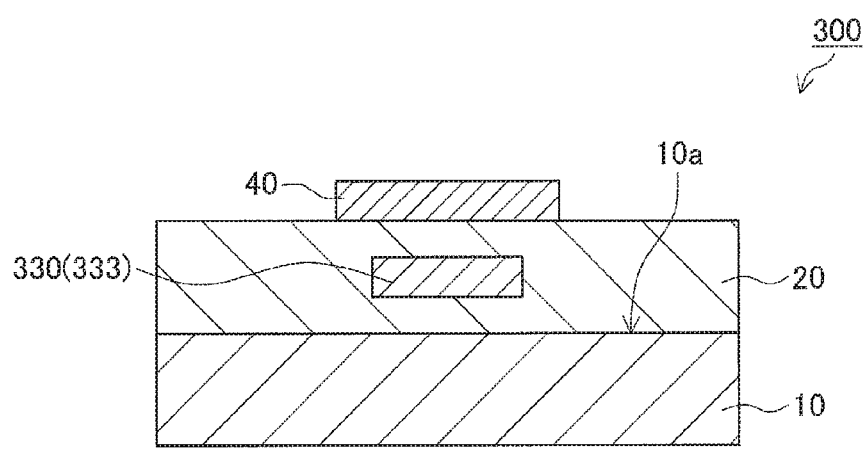
FIG. 10C is a schematic end view showing the third wavelength filter.

A third wavelength filter according to a third embodiment of the present invention will be described with reference to FIGS. 10A and 10B. FIG. 10A is a schematic perspective view showing the third wavelength filter. FIG. 10B is a schematic end view showing the third wavelength filter obtained by cutting the wavelength filter shown in FIG. 10A along line I-I and in a planar direction. Note that, in FIG. 10B, only an optical waveguide core to be described below is shown and cladding is not illustrated. Furthermore, hatching is omitted in FIG. 10B. FIG. 10C is a schematic end view showing the third wavelength filter obtained by cutting the wavelength filter shown in FIG. 10A along line II-II in a thickness direction. Note that the same reference numerals are given to structural elements common to those of the first wavelength filter, and description thereof will be omitted.

A third wavelength filter 300 is configured to include a support substrate 10, cladding 20, an optical waveguide core 330, and an electrode 40.

Here, it is preferable for the optical waveguide core 330 to be formed to have a thickness of, for example, 150 to 500 nm to satisfy a single mode condition in the thickness direction.

In addition, in the optical waveguide core 330, a first conversion part 331, a cavity part 333, and a second conversion part 335 are connected to each other in series in this order.

Gratings are formed throughout an entire length of the first conversion part 331. By using the gratings, the first conversion part 331 converts an input TE polarized wave having a specific wavelength of the fundamental mode into a TM polarized wave of the fundamental mode and reflects the wave. In addition, the first conversion part 331 transmits TE polarized waves having the other wavelengths of the fundamental mode without conversion. Further, the first conversion part 331 converts an input TM polarized wave having a specific wavelength of the fundamental mode into a TE polarized wave of the fundamental mode and reflects the wave. In addition, the first conversion part 331 transmits TM polarized waves having the other wavelengths of the fundamental mode without conversion.

A phase matching condition of the gratings is expressed by the following formula (5), where Λ represents a grating period, $n_{TE0}$ represents an equivalent refractive index with respect to the TE polarized wave of the fundamental mode, and $n_{TM0}$ represents an equivalent refractive index with respect to the TM polarized wave of the fundamental mode.

$$2\pi/\Lambda = 2\pi(n_{TE0}+n_{TM0})/\lambda \quad (5)$$

The gratings convert one of a TE polarized wave and a TM polarized wave having a wavelength λ satisfying the above formula (5), i.e., a Bragg wavelength, into the other one of the TE polarized wave and the TM polarized wave and perform Bragg-reflection on the wave.

The gratings are configured to include a fundamental region 351, a first diffraction region 353, and a second diffraction region 355. The fundamental region 351, the first diffraction region 353, and the second diffraction region 355 are provided to stretch in a length direction of the first conversion part 331. In addition, the first diffraction region 353 and the second diffraction region 355 are adjacent to the fundamental region 351 with the fundamental region 351 interposed therebetween.

The first diffraction region 353 includes a plurality of first convex parts 353a whose thickness is equal to the fundamental region 351 and a plurality of first concave parts 353b whose thickness is smaller than the fundamental region 351, which are alternately and periodically formed. In addition, the second diffraction region 355 includes a plurality of second convex parts 355a whose thickness is equal to the fundamental region 351 and a plurality of second concave parts 355b whose thickness is smaller than the fundamental region 351, which are alternately formed with the same period as that of the first diffraction region 353.

The first convex parts 353a and the second convex parts 355a are formed at antisymmetric positions with respect to the fundamental region 351. In addition, the first concave parts 353b and the second concave parts 355b are formed at antisymmetric positions with respect to the fundamental region 351.

Widths of the fundamental region 351, the first diffraction region 353, and the second diffraction region 355, thicknesses of the first concave parts 353b and the second concave parts 355b, and a period (a grating period) Λ of the first convex parts 353a, the first concave parts 353b, the second convex parts 355, the second concave parts 355b are designed to satisfy the above formula (5) with respect to the wavelength λ of light to be reflected.

Here, the cavity part 333 is formed to have a width which satisfies a single mode condition for the TE polarized wave and the TM polarized wave.

In addition, the cavity part 333 matches phases of light having a specific wavelength out of light propagating through the cavity part 333. A length of the cavity part 333 is designed in accordance with a wavelength whose phase is to be matched.

The second conversion part 335 has gratings similar to those of the first conversion part 331 that are formed throughout its entire length. By using the gratings, the second conversion part 335 converts an input TE polarized wave having a specific wavelength of the fundamental mode into the TM polarized wave of the fundamental mode and reflects the wave. In addition, the second conversion part 335 transmits TE polarized waves having the other wavelengths of the fundamental mode without conversion. Furthermore, the second conversion part 335 converts an input TM polarized wave having a specific wavelength of the fundamental mode into the TE polarized wave of the fundamental mode and reflects the wave. In addition, the second conversion part 335 transmits TM polarized waves having the other wavelengths of the fundamental mode without conversion.

In the gratings of the second conversion part 335, widths of a fundamental region 361, a first diffraction region 363, and a second diffraction region 365, thicknesses of first concave parts 363b and second concave parts 365b, a period Λ of first convex parts 363a, and the first concave parts 363b, the second convex parts 365a, and the second concave parts 365b are designed to satisfy the above formula (5) with respect to the wavelength λ of the light to be reflected under the same condition as the gratings of the first conversion part 331.

Note that a length of the second conversion part 335 (i.e., the length of the gratings) can be set to be different from the length of the first conversion part 331.

The electrode 40 is formed at a position at which the cavity part 333 is covered via the cladding 20. Joule heat can be generated by causing a current to flow in the electrode 40, and a thermo-optic effect brought about by the heating changes a refractive index of the cavity part 333. As a result, wavelengths of light transmitted by the gratings of the first conversion part 331 and the second conversion part 335 whose phases are to be matched by the cavity part 333 can be changed.

In the third wavelength filter 300, among light that is input from the first conversion part 331 and transmitted by the gratings of the first conversion part 331 and light that is reflected by the gratings of the second conversion part 335 and reflected by the first conversion part 331, light having a wavelength whose phase is matched in accordance with the length of the cavity part 333 is output from the second conversion part 335.

Therefore, the third wavelength filter 300 can be used as a wavelength filter which extracts light having a specific wavelength whose phase is matched by the cavity part 333.

Further, by setting the cavity part 333 to have a length which causes a phase of an integer multiple of π with respect to both a TE polarized wave and a TM polarized wave having a desired wavelength of the fundamental mode to be output, light having a common specific wavelength of the TE polarized wave and the TM polarized wave can be extracted. That is, the wavelength filter can be polarization-independent. Furthermore, by setting the cavity part 333 to have a length which causes a phase of an integer multiple that is twice π or more with respect to a TE polarized wave and a TM polarized wave of the fundamental mode, phases of a plurality of wavelengths of light propagating through the cavity part 333 can be matched. Therefore, the third wavelength filter 300 can output light having multimodal wavelength peaks.

In addition, in the third wavelength filter 300, the electrode 40 can apply heat to the cavity part 333. Accordingly, the cavity part 333 can change a wavelength of light whose phase is to be matched. Therefore, the third wavelength filter 300 can cause an output wavelength to be variable.

Figure 11:
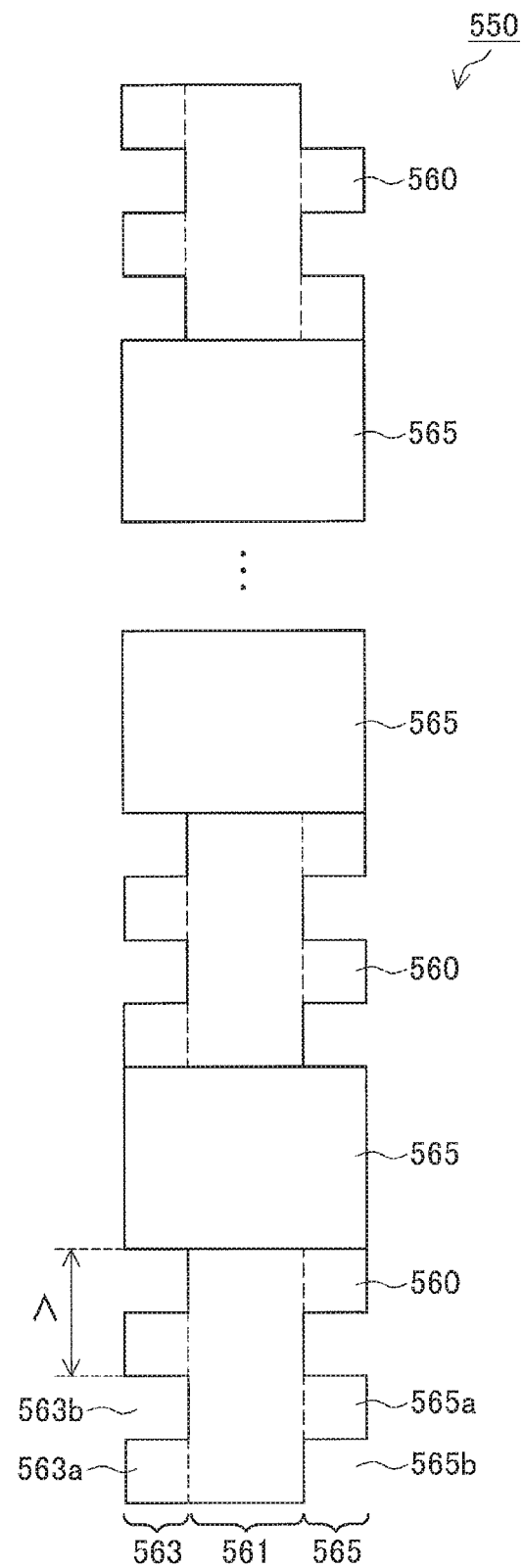
FIG. 11 is a schematic end view showing a configuration example when the third wavelength filter includes n number of conversion parts and n−1 number of cavity parts.

Furthermore, in the present embodiment, the configuration of the optical waveguide core 330 including the two conversion parts (the first conversion part 331 and the second conversion part 335) and one cavity part 33 has been described. However, it is also possible that the optical waveguide core 330 includes n (n is an integer greater than or equal to 2) number of conversion parts and n−1 number of cavity parts. The configuration of a wavelength filter including n number of conversion parts and n−1 number of cavity parts will be described with reference to FIG. 11. FIG. 11 is a schematic end view showing a wavelength filter (a wavelength filter 550) which includes n number of conversion parts and n−1 number of cavity parts, and illustrates a cross-section along a plan corresponding to FIG. 10B. Note that cladding is not illustrated in FIG. 11.

n number of conversion parts 560 and n−1 number of cavity parts 565 are alternately connected to each other in series.

Each of the conversion parts 560 has gratings similar to those of the above-described first conversion part 331 and the second conversion part 335 that are formed throughout an entire length thereof. By using the gratings, each of the conversion parts 560 converts an input TE polarized wave having a specific wavelength into a TM polarized wave and reflects the wave. Further, each of the conversion parts 560 converts an input TM polarized wave having a specific wavelength into a TE polarized wave and reflects the wave. In addition, each of the conversion parts 560 transmits TE polarized waves and TM polarized waves having the other wavelengths without conversion.

Note that some or all of lengths of the conversion parts 560 (i.e., lengths of gratings) can be different from each other. By including gratings having different lengths, a flat-top characteristic of a wavelength peak of transmitted light can be improved.

Each of the cavity parts 565 match phases of a TE polarized wave and a TM polarized wave having a specific wavelength in accordance with lengths of the cavity parts 565 among TE polarized waves and TM polarized waves propagating there through.

By connecting the conversion parts 560 and the cavity parts 565 in multiple stages as described above, a flat-top characteristic of a wavelength peak of output light can be improved.

Figure 12A:
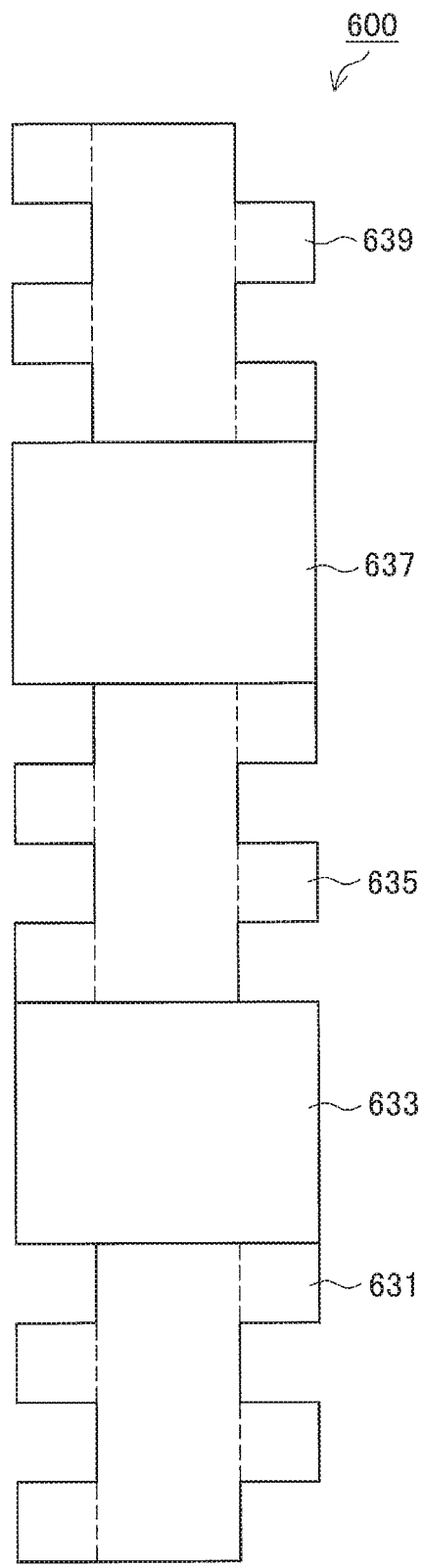
FIG. 12A is a schematic plan view showing a wavelength filter for describing operations of a wavelength filter and a ring resonator.
Figure 12B:
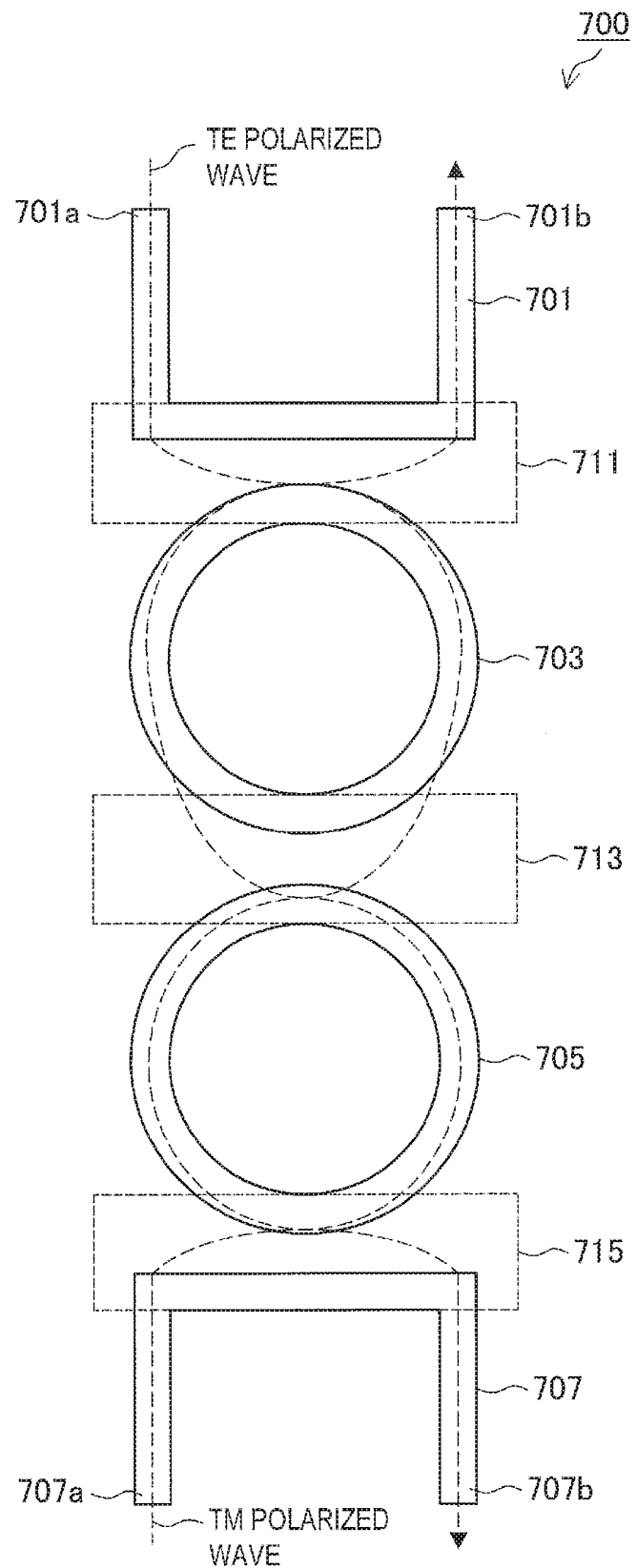
FIG. 12B is a schematic plan view showing a ring resonator for describing operations of the wavelength filter and the ring resonator.

In addition, the wavelength filter according to the present embodiment can be regarded as a wavelength filter equivalent to a known ring resonator. Here, operations of the wavelength filter according to the present embodiment and a ring resonator are compared with reference to FIGS. 12A and 12B. FIGS. 12A and 12B are schematic plan views for describing operations of the wavelength filter and a ring resonator. Specifically, FIG. 12A is a schematic end view showing the wavelength filter, illustrating a cross-section along the plan corresponding to FIG. 10B. In addition, hatching is omitted in FIG. 12A. In addition, FIG. 12B is a schematic plan view showing the ring resonator. Note that, in FIGS. 12A and 12B, cladding and support substrate are not illustrated but only optical waveguide cores are illustrated.

In a configuration example shown in FIG. 12A, the wavelength filter according to the present embodiment (a wavelength filter 600) includes three conversion parts (a first conversion part 631, a second conversion part 635, and a third conversion part 639) and two cavity parts (a first cavity part 633 and a second cavity part 637).

On the other hand, in a configuration shown in FIG. 12B, a ring resonator 700 includes two input/output parts (a first input/output part 701 and a second input/output part 707) and two ring waveguide parts (a first ring waveguide part 703 and a second ring waveguide part 705). The first input/output part 701 includes a first port 701a and a second port 701b. In addition, the second input/output part 707 includes a third port 707a and a fourth port 707b. Further, in the ring resonator 700, a first directional coupler 711 is provided between the first input/output part 701 and the first ring waveguide part 703, a second directional coupler 713 is provided between the first ring waveguide part 703 and the second ring waveguide part 705, and a third directional coupler 715 is provided between the second ring waveguide part 705 and the second input/output part 707.

In the ring resonator 700, for example, a TE polarized wave is input from the first port 701a of the first input/output part 701. The TE polarized wave proceeds to the first ring waveguide part 703, the second ring waveguide part 705, and the second input/output part 707 sequentially through the first directional coupler 711, the second directional coupler 713, and the third directional coupler 715. The TE polarized wave having a wavelength resonating the first ring waveguide part 703 and the second ring waveguide part 705 in accordance with diameters of the first ring waveguide part 703 and the second ring waveguide part 705 is output from the fourth port of the second input/output part 707. In addition, for example, a TM polarized wave is input from the third port 707a of the second input/output part 707 in the ring resonator 700. The TM polarized wave proceeds to the second ring waveguide part 705, the first ring waveguide part 703, and the first input/output part 701 sequentially through the third directional coupler 715, the second directional coupler 713, and the first directional coupler 711. In addition, the TM polarized wave having a wavelength resonating in accordance with the diameters of the second ring waveguide part 705 and the first ring waveguide part 703 is output from the second port 701b of the first input/output part 701. Note that, since a path of light is reversible, the TE polarized wave and the TM polarized wave can also propagate in an order reversed from the above described order.

The three conversion parts (the first conversion part 631, the second conversion part 635, and the third conversion part 639) of the wavelength filter 600 that perform polarization conversion correspond to the three directional couplers (the first directional coupler 711, the second directional coupler 713, and the third directional coupler 715) of the ring resonator 700 that decide a path of the TE polarized wave and the TM polarized wave. In addition, the two cavity parts of the wavelength filter 600 (the first cavity part 633 and the second cavity part 637) which match phases of wavelengths to be output correspond to the two ring wavelength parts (the first ring waveguide part 703 and the second ring waveguide part 705) of the ring resonator 700 that decide a resonant wavelength. Therefore, the wavelength filter 600 can be used as a wavelength filter equivalent to the ring resonator 700.

Here, the directional couplers 711, 713, and 715 of the ring resonator 700 are easily affected by a manufacturing error. On the other hand, the wavelength filter 600 does not include the directional coupler as a structural element. Therefore, the wavelength filter 600 is less affected by a manufacturing error than the ring resonator 700 while having the function equivalent to the ring resonator 700.

In addition, the wavelength filter 600 can be formed as one linear waveguide in which conversion parts and cavity parts are connected in series. Thus, a TE polarized wave and a TM polarized wave having specific wavelengths can be output without being propagated through different paths or curved ring waveguide.

(Evaluation of Characteristic)

The inventor conducted a simulation for evaluating a characteristic of the wavelength filter of the present embodiment by using the finite differential time domain (FDTD) method.

In the simulation, in the wavelength filter 600 including the three conversion parts and the two cavity parts illustrated in FIG. 12A, a TE polarized wave and a TM polarized wave of the fundamental mode are input from the first conversion part 631, and then intensities of the TE polarized wave and the TM polarized wave of the fundamental mode that are transmitted through the conversion parts and output from the third conversion part 639, and intensities of the TE polarized wave and the TM polarized wave of the fundamental mode that undergo polarization-conversion and that are reflected by the conversion parts and then output from the first conversion part 631 are analyzed.

In the simulation, the wavelength filter is designed as follows. That is, the optical waveguide core 330 is set to include three conversion parts and two cavity parts and have an overall thickness of 0.3 µm and width of 0.6 µm. In addition, gratings are formed in each of the conversion parts so that the first diffraction region 353 and the second diffraction region 355 have a width of 0.15 µm, the first concave parts 353b and the second concave parts 355b have a thickness of 0.22 µm, and the first convex parts 353a, the first concave parts 353b, the second convex parts 355a, the second concave parts 355b have a period Λ of 0.289 µm.

In addition, the first conversion part 631 and the third conversion part 639 that are positioned at both ends among the three conversion parts are set to have a length of 11.56 µm. In addition, the second conversion part 635 positioned at the center among the three conversion parts is set to have a length of 18.496 µm. In addition, the first cavity part 633 and the second cavity part 637 are set to have a length of 25.432 µm.

Figure 13:
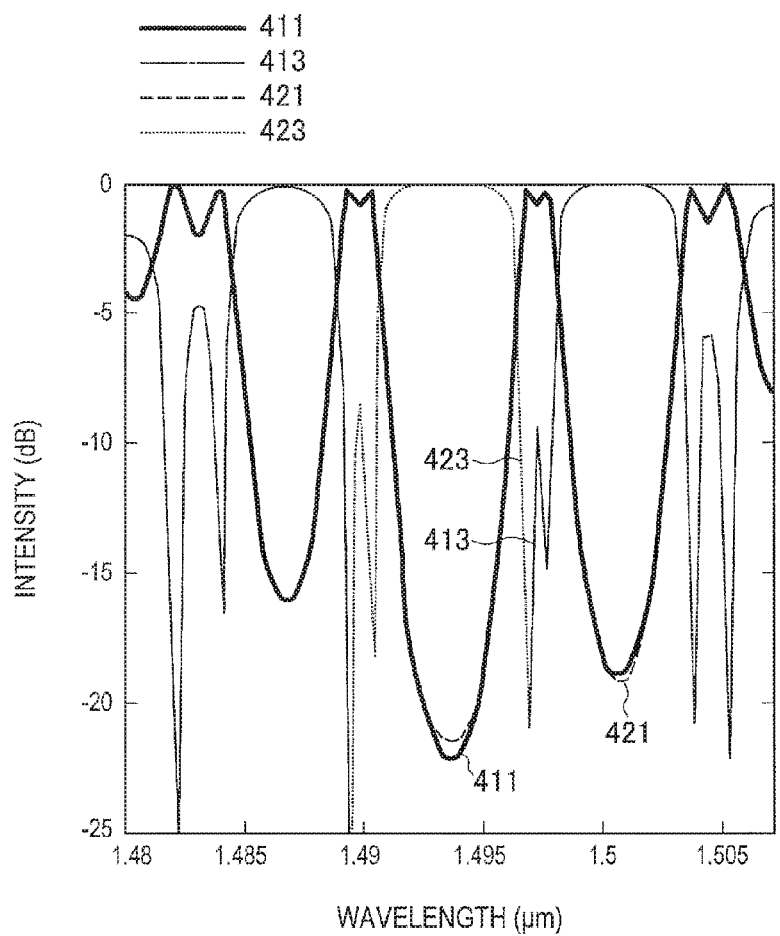
FIG. 13 is a graph showing a result of a simulation with respect to characteristic evaluation of the third wavelength filter.

A result of the simulation is shown in FIG. 13. In FIG. 13, the vertical axis represents an intensity of output light on a dB scale and the horizontal axis represents a wavelength in a unit of µm. In FIG. 13, a curve 411 represents an intensity of a TE polarized wave output from the third conversion part 639, a curve 413 represents an intensity of a TE polarized wave output from the first conversion part 631, a curve 421 represents an intensity of a TM polarized wave output from the third conversion part 639, and a curve 423 represents an intensity of a TM polarized wave output from the first conversion part 631.

As shown in FIG. 13, it can be ascertained that the TE polarized wave and the TM polarized wave have a plurality of flat-top wavelength peaks, as light output from the third conversion part 639. In addition, it can be ascertained with respect to the TE polarized wave and the TM polarized wave that the peak of transmitted light output by the third conversion part 639 coincides with a peak of reflected light output from the first conversion part 631, and thus the wavelength filter can be used in a polarization-independent manner.

The above-described wavelength filter of the embodiment can be used as a wavelength filter that outputs light having a wavelength whose phase is matched in accordance with the length of the cavity parts out of light transmitted by the conversion parts. Further, the above-described wavelength filter according to the embodiment can change a wavelength whose phase is to be matched by the cavity parts among light transmitted through the mode conversion parts when an electrode which applies a voltage or a current to the cavity parts is provided. In addition, the above-described wavelength filter according to the embodiment does not include the directional coupler as a structural element, and thus is less affected by a manufacturing error than the ring resonator while having a function equivalent to a ring resonator that outputs light having multimodal wavelength peaks.

<Manufacturing Method of Wavelength Filter According to Embodiment of Present Invention>

The first wavelength filter 100, the second wavelength filter 200, and the third wavelength filter 300 according to the embodiments can be easily manufactured using, for example, a silicon-on-insulator (SOI) substrate. A manufacturing method of the first wavelength filter 100 will be described below as an example.

First, an SOI substrate formed by sequentially stacking a support substrate layer, a $SiO_2$ layer, and a Si layer is prepared. Next, the Si layer is patterned using, for example, an etching technique, and thereby forming the optical waveguide core 30. As a result, a structure in which the $SiO_2$ layer is stacked on the support substrate layer serving as the support substrate 10 and the optical waveguide core 30 is further formed on the $SiO_2$ layer can be obtained. Next, $SiO_2$ is formed on the $SiO_2$ layer by using, for example, a CVD method, so that the optical waveguide core 30 or 230 is covered by $SiO_2$. As a result, the optical waveguide core 30 is surrounded by the cladding 20. Next, the electrode 40 is formed on the cladding 20, and thereby forming the first wavelength filter 100.

The second and third wavelength filters 200 and 300 can also be manufactured using similar processes to the first wavelength filter 100.

Heretofore, preferred embodiments of the present invention have been described in detail with reference to the appended drawings, but the present invention is not limited thereto. It should be understood that they will naturally come under the technical scope of the present invention.

What is claimed is:

1. A wavelength filter comprising:
   an optical waveguide core including n (n is an integer greater than or equal to 2) number of mode conversion parts and n−1 number of cavity parts, the mode conversion parts and the cavity parts being alternately connected to each other in series; and
   cladding surrounding the optical waveguide core,
   wherein
   the mode conversion parts convert light having a specific wavelength of a p-order mode (p is an integer satisfying p≥0) into light of a q-order mode (q is an integer satisfying q>p) and reflect the light,
   the cavity parts match phases of the light having the specific wavelength of the p-order mode propagating through the cavity parts,
   the optical waveguide core further includes an input-side tapered part connected to a mode conversion part disposed at a farthest end in the series of the mode conversion parts and the cavity parts alternately connected to each other,
   a width of the input-side tapered part continuously expands from one end of the input-side tapered part toward another end of the input-side tapered part, the other end of the input-side tapered part being connected to the mode conversion part disposed at the farthest end, and
   the one end of the input-side tapered part has a width corresponding to the p-order mode.

2. The wavelength filter according to claim 1,
   wherein gratings are formed in the mode conversion parts, and
   the gratings satisfy $2\pi/\Lambda = 2\pi(n_p + n_q)/\lambda$ with respect to a specific wavelength $\lambda$, where $\Lambda$ represents a grating period, $n_p$ represents an equivalent refractive index to the light having the specific wavelength of the p-order mode, and $n_q$ represents an equivalent refractive index to the light of the q-order mode.

3. The wavelength filter according to claim 2,
   wherein the mode conversion parts include a base formed to stretch in a length direction of the mode conversion parts and a plurality of protrusions periodically formed on side surfaces of the base,
   each of the protrusions has a unique protrusion amount, and
   the protrusion amount includes at least two or more different values.

4. The wavelength filter according to claim 1, wherein some or all of lengths of the mode conversion parts are different from each other.

5. The wavelength filter according to claim 1, further comprising:
   an electrode for applying heat to the cavity parts, the electrode being formed at a position at which the cavity parts are covered via the cladding.

* * * * *